(12) United States Patent
Yamasaki et al.

(10) Patent No.: US 8,415,419 B2
(45) Date of Patent: Apr. 9, 2013

(54) HYDROPHILIC COATING COMPOSITION AND HYDROPHILIC MEMBER USING THE SAME

(75) Inventors: Sumiaki Yamasaki, Minami-Ashigara (JP); Satoshi Tanaka, Minami-Ashigara (JP); Yuichiro Murayama, Odawara (JP); Yoshiaki Kondo, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/600,198

(22) PCT Filed: May 15, 2008

(86) PCT No.: PCT/JP2008/058972
§ 371 (c)(1),
(2), (4) Date: Nov. 13, 2009

(87) PCT Pub. No.: WO2008/143143
PCT Pub. Date: Nov. 27, 2008

(65) Prior Publication Data
US 2010/0243221 A1    Sep. 30, 2010

(30) Foreign Application Priority Data

May 15, 2007 (JP) ................ P2007-129894
Mar. 25, 2008 (JP) ................ P2008-079324

(51) Int. Cl.
*C08K 3/34* (2006.01)

(52) U.S. Cl. .......... 524/493; 428/418; 428/425.8; 428/446; 428/457; 523/400; 524/261; 524/262; 524/263; 524/265; 524/365; 524/377; 524/378; 524/388; 524/391; 524/398; 524/399; 524/492; 524/503; 524/547

(58) Field of Classification Search ......... 428/446, 428/457, 418, 425.8; 524/261, 265, 377, 524/388, 391, 492, 493, 262, 263, 365, 378, 524/398, 399, 503, 547; 523/400
See application file for complete search history.

(56) References Cited

U.S. PATENT DOCUMENTS

| | | | |
|---|---|---|---|
| 5,804,611 A | 9/1998 | Takoh | |
| 6,013,372 A | 1/2000 | Hayakawa et al. | |
| 2003/0143407 A1 | 7/2003 | Yamasaki et al. | |
| 2004/0014848 A1* | 1/2004 | Tanaka et al. | 524/107 |
| 2007/0129478 A1 | 6/2007 | Nakamura et al. | |

FOREIGN PATENT DOCUMENTS

| | | |
|---|---|---|
| EP | 0 620 255 A1 | 10/1994 |
| JP | 61-53311 A | 3/1986 |
| JP | 4-103668 A | 4/1992 |
| JP | 6-340841 A | 12/1994 |
| JP | 9-87576 A | 3/1997 |
| JP | 10-273623 A | 10/1998 |
| JP | 2001-172547 A | 6/2001 |
| JP | 2001-329227 A | 11/2001 |
| JP | 2002-12729 A | 1/2002 |
| JP | 2002-309159 A | 10/2002 |
| JP | 2002-361800 A | 12/2002 |
| JP | 3412916 B2 | 6/2003 |
| WO | WO-96/29375 A1 | 9/1996 |
| WO | WO-2005/075583 A1 | 8/2005 |

OTHER PUBLICATIONS

Article of Daily Newspaper Chemical Industry, Jan. 30, 1995.
Japanese Office Action dated Oct. 9, 2012 for Japanese Patent Application No. 2008-079324.

* cited by examiner

*Primary Examiner* — David W Wu
*Assistant Examiner* — Marie Reddick
(74) *Attorney, Agent, or Firm* — Birch, Stewart, Kolasch & Birch, LLP

(57) ABSTRACT

To provide a hydrophilic coating composition excellent in hydrophilicity, wear resistance, transparency, storage stability, antifogging properties, antifouling properties, visible light transmittivity, adhesion properties, chemical resistance, weather resistance, and water resistance and a hydrophilic member using the composition. The hydrophilic coating composition has (A) a ternary copolymer having a1) a repeating unit having a hydrophilic group, a2) a repeating unit having a hydroxyl group, an epoxy group, an isocyanato group, a blocked isocyanato group, a carboxylic acid anhydride group, or an amino group, and a3) a repeating unit having a hydrolyzable silyl group; and (B) a metal complex catalyst, wherein a content of the repeating unit a1) having a hydrophilic group is 50 mol % or greater.

11 Claims, No Drawings

HYDROPHILIC COATING COMPOSITION AND HYDROPHILIC MEMBER USING THE SAME

TECHNICAL FIELD

The present invention relates to a hydrophilic coating composition and a hydrophilic member. More specifically, the invention pertains to a hydrophilic coating composition capable of keeping its hydrophilicity and excellent in durability, transparency, storage stability, antifogging properties, antifouling properties, visible light transmittivity, chemical resistance, weather resistance, and long term stability of a coating liquid; and a hydrophilic member, fin stock, aluminum fin stock, heat exchanger, and air conditioner each using the hydrophilic coating composition.

BACKGROUND ART

Products/members having a resin film surface have been used in wide fields and they have been used after processed to have respective functions, depending on their intended use. In general, their surface however shows hydrophobicity/lipophilicity due to original properties of the resins. When oils and the like attach to such a surface as dirt, they cannot be removed easily. Accumulation of oil and the like sometimes extremely deteriorates the functions/properties of the products/members having such a surface. On the other hand, when products/members having a transparent function are exposed to high-humidity conditions or falling rain, water droplets attached thereto cause diffuse reflection and inhibit light transmission. Similarly, products/members having an inorganic surface such as glass or metal exhibit neither sufficient antifouling properties against dirt such as oil attached thereto nor sufficient antifogging properties when water droplets attach to thereto. In particular, there is an eager demand for the development of glass for automobiles or building materials having antifouling properties or antifogging properties, because hydrophobic contaminants, e.g., combustion products such as carbon black contained in a dust from urban areas or exhaust gas from automobiles, oils or fats, and components released from sealants adhere to the glass or water droplets adhere to the glass and hinder the vision through the glass (reflection in the case of a mirror).

Supposing from the viewpoint of the antifouling property that the dirt is an organic substance such as oil, it is necessary to reduce the interaction between the dirt and the surface of the material, in short, to make the surface hydrophilic or oil-repellent in order to prevent the surface from being contaminated. With regards to the antifogging properties, it is necessary to impart, to the surface of products/members, extended wettability (namely, hydrophilicity) for spreading attached water droplets uniformly on the surface or water repellency such that attached water droplets can be removed easily. Accordingly, antifouling/antifogging materials under investigation may tend to rely on hydrophilization or water repellency or oil repellency.

Surface treatment for hydrophilization heretofore proposed, for example, etching treatment or plasma treatment enables high-level surface hydrophilization, but its effect is temporary and the hydrophilic state cannot be kept for a long period of time. There is also proposed a surface-hydrophilic coating film using a hydrophilic graft polymer as one of hydrophilic resins (refer to, for example, Non-patent Document 1). According to this report, this coating film has hydrophilicity to some extent, but is required to have higher durability because it has only insufficient affinity to substrates.

For another member having a surface hydrophilic function, use of titanium oxide as a photocatalyst has conventionally been known. This utilizes an oxidative decomposition function and a hydrophilization function of an organic substance due to exposure to light. For example, it is disclosed that when a photocatalyst-containing layer is formed on the surface of a substrate, the surface is made highly hydrophilic, depending on the optical excitation via the photocatalyst. It is reported that when this technique is applied to various composite materials such as glass, lenses, mirrors, exterior materials and water supply members, it may give excellent antifogging and antifouling functions to these composite materials (refer to, for example, Patent Document 1). Although members obtained by applying titanium oxide onto a glass surface have been used, as a self cleaning material, for windowpanes of building materials or front glass of automobiles, exposure to sun light for long hours is necessary for them to exhibit functions such as antifouling properties and antifogging properties. Deterioration of their properties due to dirt accumulated with the passage of time is inevitable. In addition, since they do not have sufficient film strength, they need improvement in durability. Self cleaning films obtained by forming a titanium oxide layer on a plastic substrate have been used for side mirrors of automobiles, but their film strength is also insufficient so that hydrophilic materials having better wear resistance are required.

To solve the above-mentioned problems, an attention was paid to the properties of a sol-gel organic-inorganic hybrid film and it has been found that a hydrophilic surface having a crosslinked structure formed through hydrolysis and polycondensation of a hydrophilic polymer and an alkoxide exhibits excellent antifogging properties and antifouling properties and at the same time, has good wear resistance (refer to, for example, Patent Document 2). The film is desired to have further improved adhesion properties.

On the other hand, with regards to coating compositions, there is proposed a curable composition containing a copolymer component composed of a hydrolyzable-silyl-containing vinyl monomer, an alcoholic-hydroxyl-containing vinyl monomer, and a tertiary-amino-containing vinyl monomer. The composition is suited for top coat of automobiles because it has good acid resistance, water resistance, and weather resistance (refer to, for example, Patent Document 3). A coating composition containing a hydrolysate or partial condensate of an organosilane and a vinyl copolymer is proposed and a film excellent in weather resistance and contamination resistance can be obtained using the composition (refer to, for example, Patent Document 4). Films available using these coating compositions are however lipophilic and have low antifogging properties. In addition, they are limited in antifouling properties. There is therefore a demand for further improvement of antifogging properties and antifouling properties.

A heat exchanger of an air conditioner is formed of a pipe for transferring a heat medium and a fin for absorbing heat in the air or diffusing heat from the heat medium. In a room air conditioner, a copper pipe is penetrated through fin stocks, that is, thin aluminum plates having a thickness of about 0.1 mm. With regard to fin stocks, cohesive water generated during cooling becomes water droplets and remain between fins. Water bridges formed by them reduce the cooling capacity and dusts attached between fin stocks also deteriorate the cooling capacity.

Patent Document 1: WO96/29375
Patent Document 2: Japanese Patent Laid-Open No. 2002-361800
Patent Document 3: Japanese Patent No. 3412916
Patent Document 4: Japanese Patent Laid-Open No. Hei 10-273623
Non-patent document 1: The Chemical Daily, Jan. 30, 1995

DISCLOSURE OF THE INVENTION

Problems that the Invention is to Solve

An object of the present invention is to provide a hydrophilic coating composition and a hydrophilic member obtained using the composition, each excellent in hydrophilicity on the surfaces of various substrates, having better wear resistance, and excellent in transparency, storage stability, antifogging properties, antifouling properties, visible light transmittivity, adhesion properties, chemical resistance, weather resistance, and water resistance.

Means for Solving the Problems

With a view to overcoming the above problems, the present inventors have proceeded with research of a sol-gel organic/inorganic hybrid film and extended the above conventional art. The above problems are solved by the following constitutions.

1. A hydrophilic coating composition comprising:
   (A) a ternary copolymer having
   a1) a repeating unit having at least one hydrophilic group,
   a2) a repeating unit having at least one of a hydroxyl group, an epoxy group, an isocyanato group, a blocked isocyanato group, a carboxylic acid anhydride group, and an amino group, and
   a3) a repeating unit having at least one hydrolyzable silyl group; and
   (B) a metal complex catalyst,
   wherein
   a content of the repeating unit a1) having at least one hydrophilic group in the ternary copolymer is 50 mol % or greater.

2. The hydrophilic coating composition as described above in 1,
   wherein the repeating unit a1) has Log P of from 1 to −6.

3. The hydrophilic coating composition as described above in 1 or 2,
   wherein the metal complex catalyst (B) has:
   a metal element selected from metal elements in Groups 2A, 3B, 4A, and 5A of the periodic table; and
   an oxo or hydroxy oxygen compound selected from β-diketones, ketoesters, hydroxycarboxylic acids or esters thereof, amino alcohols, and enolic active hydrogen compounds.

4. The hydrophilic coating composition as described above in any one of 1 to 3, further comprising:
   (C) an alkoxide compound containing an element selected from Si, Ti, Zr, and Al and/or colloidal silica.

5. The hydrophilic coating composition as described above in any one of 1 to 4, further comprising (D) a compound having in the molecule thereof at least two groups selected from a hydroxyl group, an epoxy group, an isocyanato group, a blocked isocyanato group, and an amino group.

6. The hydrophilic coating composition as described above in any one of 1 to 5, further comprising:
   a hydrophilic polymer containing a structural unit represented by the following formula (III):

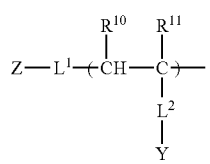

(III)

in the formula (III), $R^{10}$ and $R^{11}$ each independently represents a hydrogen atom or a hydrocarbon group; Z represents a reactive group; $L^1$ and $L^2$ each independently represents a single bond or a linking group; and Y represents —OH, —$OR_a$, —$COR_a$, —$CO_2R_e$, —$CON(R_a)(R_b)$, —$N(R_a)(R_b)$, $NHCOR_d$, —$NHCO_2R_d$, —$OCON(R_a)(R_b)$, —$NHCON(R_a)(R_b)$, —$SO_3R_e$, $OSO_3R_e$, —$SO_2R_d$, —$NHSO_2R_d$, —$SO_2N(R_a)(R_b)$, —$N(R_a)(R_b)(R_c)$, —$N(R_a)(R_b)(R_c)(R_g)$, —$PO_3(R_e)(R_f)$, —$OPO_3(R_e)(R_f)$ or —$PO_3(R_d)(R_e)$, wherein $R_a$, $R_b$ and $R_c$ each independently represents a hydrogen atom or an alkyl group; $R_d$ represents an alkyl group; $R_e$ and $R_f$ each independently represents a hydrogen atom, an alkyl group, an alkali metal, an alkaline earth metal, or an onium; $R_g$ represents an alkyl group, a halogen atom, an inorganic anion, or an organic anion; and $R_a$ to $R_g$ may be each coupled to form a ring, and wherein a mass ratio of the hydrophilic polymer containing a structural unit represented by the formula (III)/the ternary copolymer (A) falls within a range of from 50/50 to 5/95.

7. A hydrophilic member obtained by applying the hydrophilic coating composition as described above in any one of 1 to 6 onto a support.

8. A fin stock obtained by applying the hydrophilic coating composition as described above in any one of 1 to 6.

9. An aluminum fin stock obtained by making the fin stock as described above in 8 from aluminum.

10. A heat exchanger obtained using the aluminum fin stock as described above in 9.

11. An air conditioner obtained using the heat exchanger as described above in 10.

Advantage of the Invention

The present invention can provide a hydrophilic layer and a hydrophilic member having a surface excellent in hydrophilicity because a hydrophilic polymer used for them has a crosslinked structure formed by hydrolysis and polycondensation of a hydrolyzable silyl group and has many hydrophilic groups.

In addition, the crosslinked structure obtained by hydrolysis and polycondensation of a hydrolyzable silyl group enables to form a cured film having a high crosslink density, excellent strength, and good durability. A hydrophilic layer formed on a substrate such as glass substrate or plastic substrate does not cause disorders such as cracks when bent during handling at the time of manufacture so that the present invention can provide an always normal hydrophilic layer and hydrophilic member.

In addition, the hydrophilic coating composition of the present invention (which may also be called "hydrophilic-layer coating-liquid composition" or "hydrophilic composition") uses a metal complex catalyst so that a drying temperature for forming a hydrophilic layer can be set low and therefore, thermal deformation on a substrate can be inhibited.

Moreover, the hydrophilic coating composition of the present invention can provide a cured film having a high crosslink density by hydrolysis and polycondensation of a hydrolyzable silyl group, though having high surface hydrophilicity so that the invention can provide a hydrophilic layer and a hydrophilic member having good wear resistance and excellent in transparency, storage stability, antifogging properties, antifouling properties, visible light transitivity, adhesion properties, chemical resistance, weather resistance, and water resistance.

BEST MODE FOR CARRYING OUT THE INVENTION

The present invention will hereinafter be described specifically.

[(A) Ternary Copolymer]

The ternary copolymer (A) of the present invention is a ternary copolymer having a1) a repeating unit having at least one hydrophilic group, a2) a repeating unit having at least one of a hydroxyl group, an epoxy group, an isocyanato group, a blocked isocyanato group, a carboxylic acid anhydride group, and an amino group; and a3) a repeating unit having at least one hydrolyzable silyl group.

In the present specification, the ternary copolymer (A) may also be called "specific ternary copolymer".

The above-mentioned a1) is preferably a vinyl monomer unit represented by the following formula (I) and in the formula (I), $R^1$ and $R^2$ each independently represents a hydrogen atom or a hydrocarbon group; L represents a single bond or a linking group; and Y represents a hydrophilic group, preferably —NHCOR$^3$, CONH$_2$, —CON(R$^3$)$_2$, —COR$^3$, —CO$_2$M, —SO$_3$M, —PO$_3$M, —OPO$_3$M, or —N(R$^3$)$_3$Z, in which $R^3$ represents an alkyl group, an aryl group, or an aralkyl group, M represents a hydrogen atom, an alkali metal, an alkaline earth metal, or an onium; and Z represents a halogen ion.

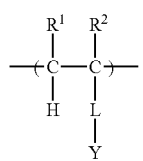

(I)

In the formula (I), $R^1$ and $R^2$ each independently represents a hydrogen atom or a hydrocarbon group. Examples of the hydrocarbon group include alkyl groups and aryl groups. They are preferably hydrocarbon groups having 8 or less carbon atoms, more preferably linear, branched or cyclic alkyl groups having 8 or less carbon atoms. Specific examples include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, and a cyclopentyl group. $R^1$ and $R^2$ are each preferably a hydrogen atom, a methyl group, or an ethyl group from the standpoints of effect and easy availability.

These hydrocarbon groups may further have a substituent. When the alkyl group has a substituent, the substituted alkyl group is composed of a substituent and an alkylene group bonding together, in which the substituent may be a monovalent non-metal atom group except hydrogen. Preferred examples of the substituent include halogen atoms (—F, —Br, —Cl, and —I), alkoxy groups, aryloxy groups, alkylthio groups, arylthio groups, N-alkylamino groups, N,N-dialkylamino groups, acyloxy groups, N-alkylcarbamoyloxy groups, N-arylcarbamoyloxy groups, acylamino groups, formyl groups, acyl groups, carboxyl groups, alkoxycarbonyl groups, aryloxycarbonyl groups, carbamoyl groups, N-alkylcarbamoyl groups, N,N-dialkylcarbamoyl groups, N-arylcarbamoyl groups, N-alkyl-N-arylcarbamoyl groups, sulfo groups, sulfonato groups, sulfamoyl groups, N-alkylsulfamoyl groups, N,N-dialkylsulfamoyl groups, N-arylsulfamoyl groups, N-alkyl-N-arylsulfamoyl groups, phosphono groups, phosphonato groups, dialkylphosphono groups, diarylphosphono groups, monoalkylphosphono groups, alkylphosphonato groups, monoarylphosphono groups, arylphosphonato groups, phosphonooxy groups, phosphonatooxy groups, aryl groups, and alkenyl groups.

On the other hand, the alkylene group of the substituted alkyl group is preferably a divalent organic residue obtained by removing any one of hydrogen atoms on alkyl groups having from 1 to 20 carbon atoms, more preferably a linear alkylene group having from 1 to 12 carbon atoms, a branched alkylene group having from 3 to 12 carbon atoms, or a cyclic alkylene group having from 5 to 10 carbon atoms. Preferred specific examples of the substituted alkyl group available from combination of the substituent and the alkylene group include a chloromethyl group, a bromomethyl group, a 2-chloroethyl group, a trifluoromethyl group, a methoxymethyl group, a methoxyethoxyethyl group, an allyloxymethyl group, a phenoxymethyl group, a methylthiomethyl group, a tolylthiomethyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-oxyethyl group, a 2-oxypropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxyphenyl)carbamoylethyl group, an N-methyl-N-(sulfophenyl) carbamoylmethyl group, a sulfobutyl group, a sulfonatobutyl group, a sulfamoylbutyl group, an N-ethylsulfamoylmethyl group, an N,N-dipropylsulfamoylpropyl group, an N-tolylsulfamoylpropyl group, an N-methyl-N-(phosphonophenyl) sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonoxypropyl group, a phosphonatooxybutyl group, a benzyl group, a phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenylmethyl group, a 2-propynyl group, a 2-butynyl group, and a 3-butynyl group.

L represents a single bond or an organic linking group. When L represents an organic linking group, L represents a polyvalent linking group made of non-metal atoms. Concretely, it may comprise from 0 to 60 carbon atoms, from 0 to 10 nitrogen atoms, from 0 to 50 oxygen atoms, from 0 to 100 hydrogen atoms, and from 0 to 20 sulfur atoms. More specific examples of the linking group are the following structural units and combinations thereof.

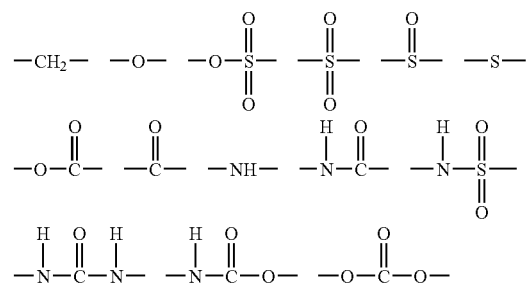

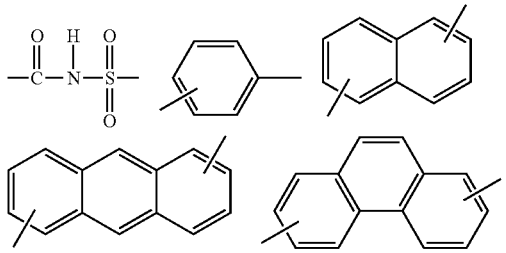

Y represents a hydrophilic group, preferably —NHCOR$^3$, CONH$_2$, —CON(R$^3$)$_2$, —COR$^3$, —OH, —CO$_2$M, —SO$_3$M, —PO$_3$M, —OPO$_3$M, or —N(R$^3$)$_3$Z, in which R$^3$ represents a linear, branched or cyclic alkyl group (preferably having from 1 to 18 carbon atoms), an aryl group, or an aralkyl group, M represents a hydrogen atom, an alkali metal, an alkaline earth metal, or an onium; and Z represents a halogen ion. When Y has a plurality of R$^3$ such as —CON(R$^3$)$_2$, R$^3$ may be coupled to form a ring and the ring thus formed may be a heterocycle containing a hetero atom such as oxygen atom, sulfur atom or nitrogen atom. R$^3$ may have a substituent further and the substituent introducible into them may be the same as those mentioned hereinabove for the alkyl group for R$^1$ and R$^2$.

Preferred specific examples of R$^3$ include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, and a cyclopentyl group. Examples of M include a hydrogen atom, alkali metals such as lithium, sodium, and potassium, alkaline earth metals such as calcium and barium, and oniums such as ammonium, iodonium, and sulfonium. Preferred specific examples of Y include —NHCOCH$_3$, —CONH$_2$, —COON, —SO$_3^-$NMe$_4^+$, and a morpholyl group.

The repeating unit represented by a1) has Log P of preferably from 1 to −6, more preferably from 0 to −5. Log P within this range can provide good hydrophilicity and antifouling properties.

The term "log P" as used herein means a logarithm of an octanol/water distribution coefficient (P) of a compound calculated using a software "PCModels" developed by Medical Chemistry Project. Ponoma College, Claremont. Calif. and available from Daylight Chemical Information System Inc.

These repeating units represented by a1) may be used either singly or in combination of two or more thereof.

The a2) is preferably a vinyl monomer unit having at least one of a hydroxyl group, an epoxy group, an isocyanato group, a blocked isocyanato group, a carboxylic acid anhydride group, and an amino group, especially preferably at least one of a hydroxyl group and an epoxy group from the standpoint of hydrophilicity and film strength. Examples of the vinyl monomer having at least one hydroxyl group include 2-hydroxyethyl (meth)acrylate; 2-hydroxypropyl (meth)acrylate; 2-hydroxyethyl vinyl ether; N-methylol (meth)acrylamide; "ARONIX 5700" 2-hydroxy-3-phenoxypropyl acrylate manufactured by Toagosei; 4-hydroxystyrene; "HE-10", "HE-20", "HP-10", and "HP-20" (each, an acrylate oligomer having, at the end thereof, a hydroxyl group) manufactured by Nippon Shokubai Kagaku Kogyo; "BLEMMER PP SERIES" polypropylene glycol methacrylate. "BLEMMER PE SERIES polyethylene glycol monomethacrylate, "BLEMMER PEP SERIES" polyethylene glycol polypropylene glycol methacrylate, "BLEMMER AP-400" polypropylene glycol monoacrylate, "BLEMMER AE-350" polyethylene glycol monoacrylate, "BLEMMER NKH-5050" polypropylene glycol polytrimethylene monoacrylate, and "BLEMMER GLM" glycerol monomethacrylate, each manufactured by NOF Corporation; and ε-caprolactone-modified hydroxyalkylvinyl monomers available from a reaction between a hydroxyl-containing vinyl compound and ε-caprolactone.

Typical examples of the ε-caprolactone-modified hydroxyalkylvinyl monomer include "PLACCEL FA-1" (R=H, n=1), "PLACCEL FA-4" (R=H, n=4), "PLACCEL FM-1" (R=CH$_3$, n=1), and "PLACCEL FM-4" (R=CH$_3$; n=4), each manufactured by Daicel Chemical Industries, and "TONE M-100" (R=H, n=2) and "TONE M201" (R=CH$_3$, n=1), each manufactured by UCC, which have a structure represented by the following formula.

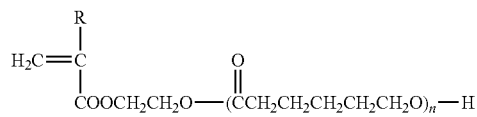

wherein, R represents H or CH$_3$ and n stands for an integer of 1 or greater.

Examples of the vinyl monomer having at least one epoxy group include glycidyl (meth)acrylate, 2-methylglycidyl (meth)acrylate, and allyl glycidyl ether.

Examples of the vinyl monomer having at least one isocyanato group or blocked isocyanato include isocyanatoethyl acrylate, isocyanatoethyl methacrylate, isocyanatopropyl acrylate, and isocyanatopropyl methacrylate. They may be used either singly or as a mixture of two or more thereof. Examples of a blocking agent of these isocyanato compounds include alcohols, oximes, and active methylenes. Of these, oximes and active methylenes are preferred from the standpoint of deblocking efficiency. No particular limitation is imposed on the oximes and examples include formamidoxime, acetaldoxime, acetoxime, methylethylketoxime, diacetyl monoxime, benzophenone oxime, and cyclohexane oxime. No particular limitation is imposed on the active methylenes and examples include dimethyl malonate, diethyl malonate, ethyl acetoacetate, methyl acetoacetate, and acetylacetone. They may be used either singly or in combination of two or more thereof.

Examples of the vinyl monomer having at least one carboxylic acid anhydride group include maleic anhydride, itaconic anhydride, and citraconic anhydride.

Examples of the vinyl monomer having at least one amino group include N,N-dialkylaminoalkyl (meth)acrylates such as N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, and aminoethyl (meth)acrylate.

They may be used, as the component a2), either singly or in combination of two or more of them.

The component a3) is a structural unit available from hydrolyzable-silyl-containing vinyl monomers and examples include vinyltrimethoxysilane, vinyltriethoxysilane, vinyltris(2-methoxyethoxy)silane, γ-(meth)acryloyloxypropyltrimethoxysilane, γ-(meth)acryloyloxypropylmethyldimethoxysilane, γ-(meth)acryloyloxypropyltriethoxysilane, β-(meth)acryloyloxyethyltrimethoxysilane, γ-(meth)acrylamidopropyltriethoxysilane, and γ-(meth)

acrylamidopropyltrimethoxysilane. They may be used, as the component a3), either singly or in combination of two or more of them.

Preferred examples include vinyltrimethoxysilane, vinyltriethoxysilane, γ-(meth)acrylamidopropyltriethoxysilane, and γ-(meth)acrylamidopropyltrimethoxysilane. Of these, γ-(meth)acrylamidopropyltriethoxysilane, and γ-(meth)acrylamidopropyltrimethoxysilane are more preferred from the standpoint of hydrophilicity.

The term "hydrolyzable silyl group" means a group producing silanol (Si—OH) as a result of reaction with water.

With regard to the amount of each repeating unit of the specific ternary copolymer (A), the amount of the component a1) is 50 mol % or greater, preferably from 50 to 90 mol %, more preferably from 60 to 85 mol %. Amounts of 50 mol % or greater improve the hydrophilicity and antifouling properties, while those not greater than 90 mol % improve the adhesion properties and strength. The amount of the component a2) is preferably from 1 to 45 mol %, more preferably from 5 to 40 mol %. Amounts of 1 mol % or greater improve the adhesion properties, while those not greater than 45 mol % improve the strength. The amount of the component a3) is preferably from 1 to 45 mol %, more preferably from 5 to 40 mol %. Amounts of 1 mol % or greater improve the strength, while those not greater than 45 mol % improve the adhesion properties.

The mass-average molecular weight of the specific ternary copolymer (A) is preferably from 1,000 to 1,000,000, more preferably from 1,000 to 500,000, most preferably from 1,000 to 200,000. The mass-average molecular weight can be measured using GPC (polyethylene oxide standard).

Relative to the nonvolatile component of the hydrophilic composition of the present invention, the specific ternary copolymer (A) relating to the present invention is contained in an amount of preferably from 5 to 99 mass %, more preferably from 15 to 99 mass %, most preferably from 20 to 99 mass % from the standpoint of curability and hydrophilicity. They may be used either singly or in combination of two or more of them. The term "nonvolatile component" as used herein means a component obtained by removing a volatile solvent from the hydrophilic composition.

The specific ternary copolymer (A) preferably used in the present invention can be prepared in a known manner, for example, by the method described in *Polymer Chemical*, 7, 142 (1950). The specific ternary copolymer may be any one of a random polymer, a block polymer, or a graft polymer. Of which, a random polymer is preferred and it may be selected as needed, depending on the polymerization system. For example, it is synthesized through radical polymerization using a polymerization initiator, e.g., a peroxide such as di-t-butyl peroxide or benzoyl peroxide, a persulfate such as ammonium persulfate, or an azo compound such as azobisisobutyronitrile or dimethyl 2,2'-azobis(2-methylpropionate). As the polymerization system, solution polymerization, emulsion polymerization, suspension polymerization or the like may be employed.

The following are specific examples of the specific ternary copolymer (A) preferably used in the present invention, but the present invention is not limited to them.

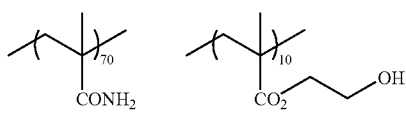

(1)

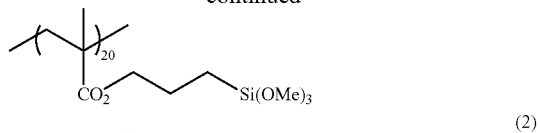

(2)

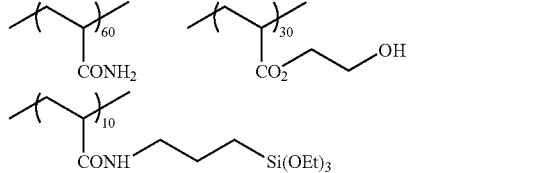

(3)

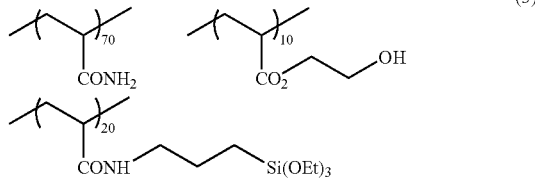

(4)

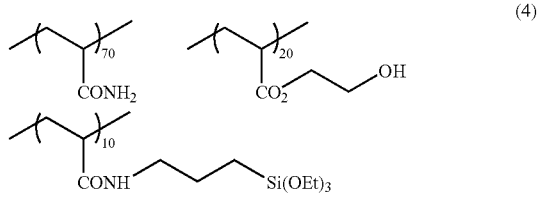

(5)

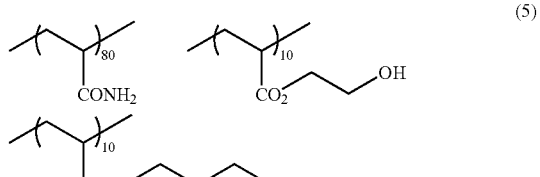

(6)

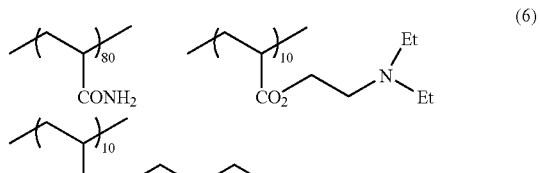

(7)

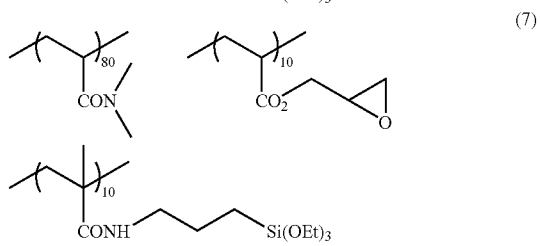

(8)

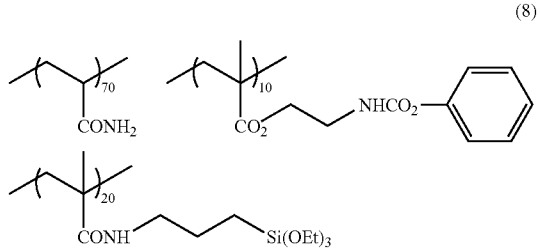

(9)

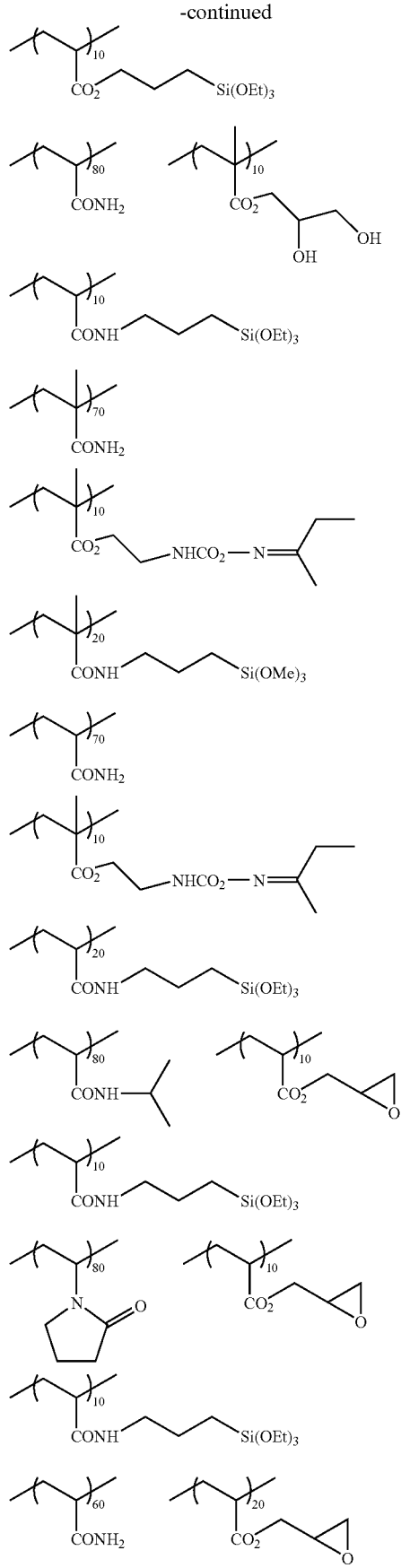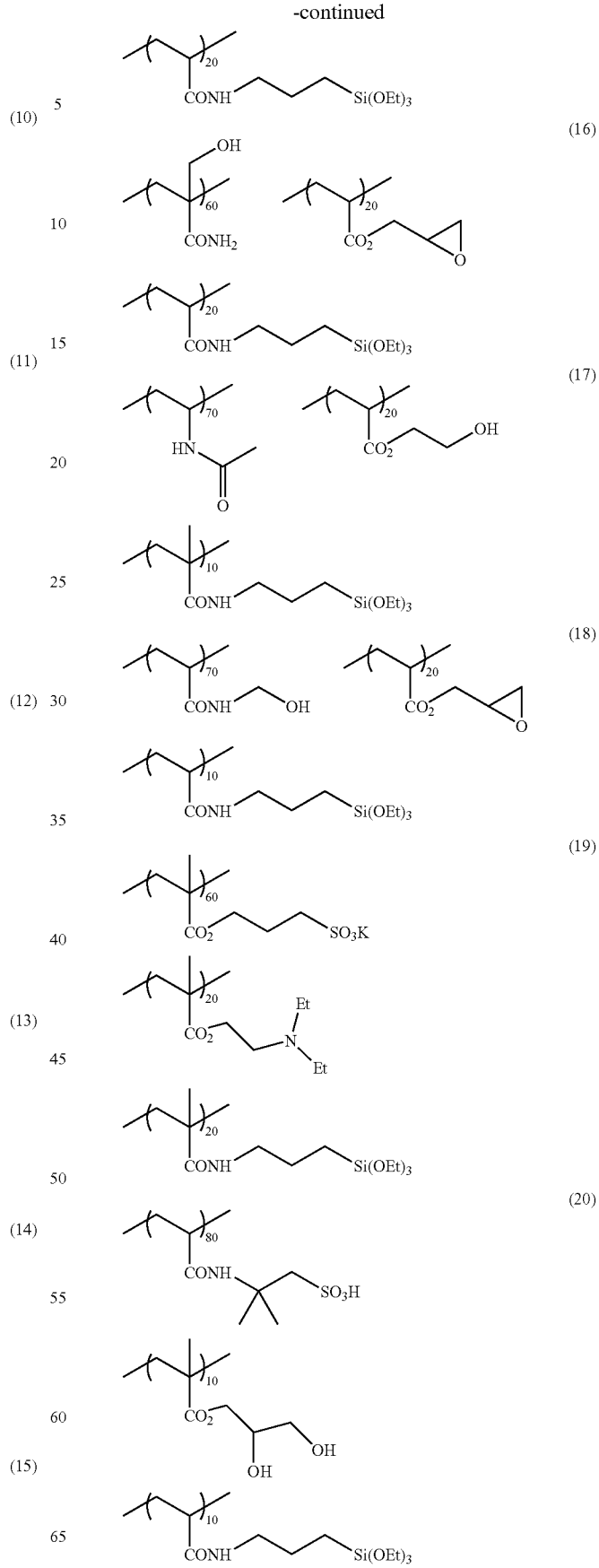

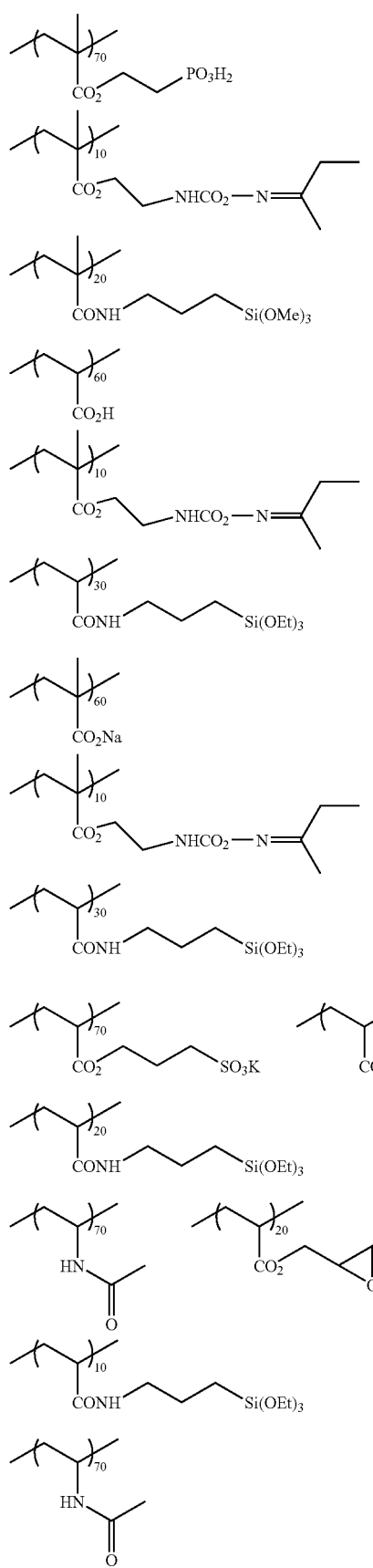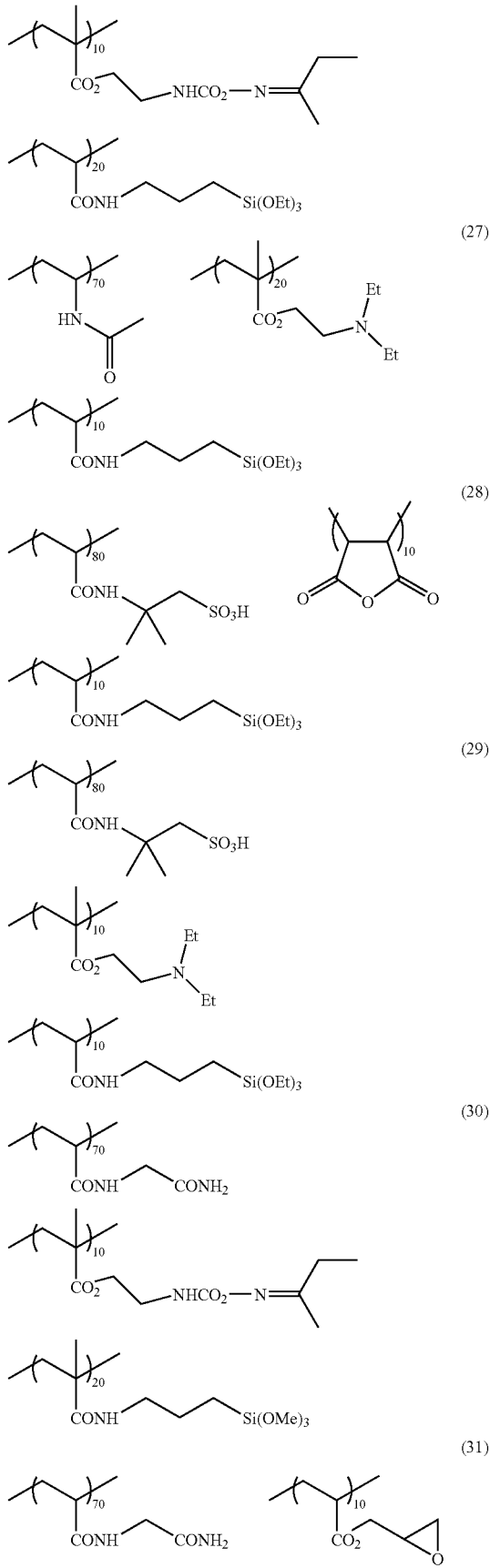

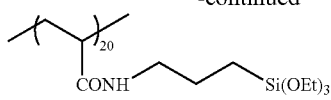

(32)

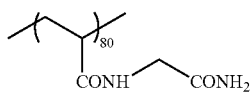 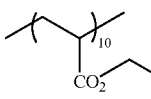

(33)

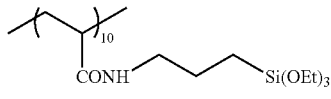

(34)

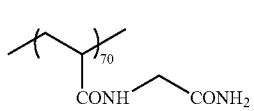

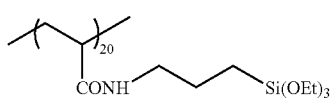

(35)

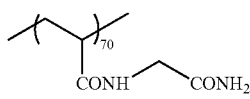

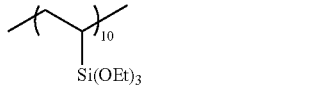

(36)

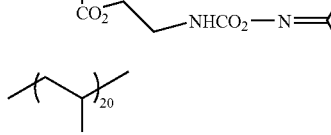

(37)

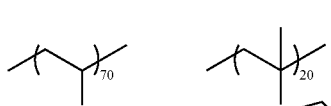

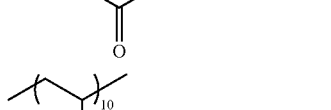 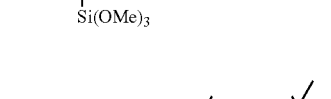

(38)

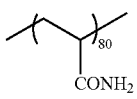 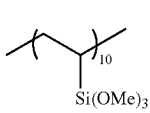

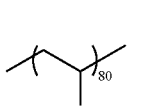

(39)

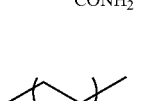 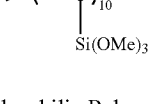

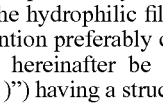

[Hydrophilic Polymer]

The hydrophilic film forming composition of the present invention preferably contains a hydrophilic polymer (which may hereinafter be called "specific hydrophilic polymer (A-1)") having a structural unit represented by the following formula (III) from the viewpoint of adhesion properties and antifouling properties. In general, mixing of the specific hydrophilic polymer (A-1) in the specific ternary copolymer (A) may deteriorate adhesion properties and water resistance. In the present invention, an unexpected effect, that is, improvement of both adhesion properties and antifouling properties can be achieved while maintaining hydrophilicity by adjusting a (specific hydrophilic polymer (A-1))/(specific ternary copolymer (A)) ratio in the hydrophilic composition to fall within a specific range.

The (specific hydrophilic polymer (A-1))/(specific ternary copolymer (A)) mass ratio falls within a range of preferably from 50/50 to 5/95, more preferably from 40/60 to 10/90.

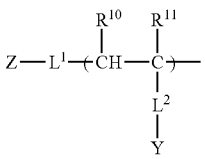

(III)

In the formula (III), $R^{10}$ and $R^{11}$ each independently represents a hydrogen atom or a hydrocarbon group, Z represents a reactive group, $L^1$ and $L^2$ each independently represents a single bond or a linking group, and Y represents —OH, —$OR_a$, —$COR_a$, —$CO_2R_e$, —$CON(R_a)(R_b)$, —$N(R_a)(R_b)$, —$NHCOR_d$, —$NHCO_2R_d$, —$OCON(R_a)(R_b)$, —NHCON$(R_a)(R_b)$, —$SO_3R_e$, —$OSO_3R_e$, —$SO_2R_d$, —$NHSO_2R_d$, —$SO_2N(R_a)(R_b)$, —$N(R_a)(R_b)(R^c)$, —$N(R_a)(R_b)(R_c)(R_g)$, —$PO_3(R_e)(R_f)$, —$OPO_3(R_e)(R_f)$, or —$PO_3(R_d)(R_e)$, wherein $R_a$, $R_b$, and $R_c$ each independently represents a hydrogen atom or a linear, branched, or cyclic alkyl group, $R_d$ represents a linear, branched, or cyclic alkyl group, $R_e$ and $R_f$ each independently represents a hydrogen atom, a linear, branched, or cyclic alkyl group, an alkali metal, an alkaline earth metal, or an onium, $R_g$ represents a linear, branched, or cyclic alkyl group, a halogen atom, an inorganic anion, or an organic anion, and $R_a$ to $R_s$ may be coupled together to form a ring.

The specific hydrophilic polymer (A-1) preferably used in the present invention has a reactive group and a hydrophilic group. The polymer sometimes has the reactive group at only one end of its main chain or sometimes has a plurality of the reactive groups in the main chain.

The term "reactive group" means a functional group capable of forming a chemical bond as a result of a reaction with a hydrolysate and polycondensation product of a metal alkoxide. The reactive groups may form a chemical bond. It is preferred that the hydrophilic polymer is water soluble and becomes insoluble in water after a reaction with the hydrolysate and polycondensation product of the metal alkoxide.

The term "chemical bond" embraces, as well as the ordinary meaning, covalent bond, ionic bond, coordination bond, and hydrogen bond. The chemical bond is preferably covalent bond.

The reactive groups are usually similar to reactive groups contained in a crosslinking agent for polymers and are compounds capable of forming a crosslink with an aid of heat or light. A description on crosslinking agents can be found in "Crosslinking Agent Handbook" written by Shinzo Yamashita and Tosuke Kaneko, published by Taiseisha (1981).

Examples of the reactive group include carboxyl groups (HOOC—), salts thereof (MOOC—, in which M represents a cation), carboxylic acid anhydride groups (for example, monovalent groups derived from succinic anhydride, phthalic anhydride, or maleic anhydride), amino ($H_2N$—), hydroxyl (HO—), epoxy groups (such as glycidyl group), methylol (HO—$CH_2$—), mercapto (HS—), isocyanato (OCN—), blocked isocyanato groups, alkoxysilyl groups, alkoxy titanate groups, alkoxy aluminate, alkoxy zirconate groups, ethylenically unsaturated double bonds, ester bonds, and tetrazole groups. The reactive group is most preferably an alkoxysilyl group. The hydrophilic polymer may have, at one end thereof, two or more reactive groups. Two or more reactive groups may be different from each other.

A linking group may be interposed between the repeating unit of the specific hydrophilic polymer (A-1) and the reactive group or between the repeating unit of the specific hydrophilic polymer (A-1) and the main chain. The liking groups $L^1$ and $L^2$ have the same meanings as the linking group L of the specific ternary copolymer (A) represented by the above formula (I).

The hydrocarbon groups represented by $R^{10}$ and $R^{11}$ are similar to those represented by $R^1$ and $R^2$ in the specific hydrophilic polymer (A) represented by the formula (I) and preferred ones of them are also similar. Y represents a hydrophilic group and has the same meaning as Y in the specific hydrophilic polymer (A) and preferred ones are also similar.

The specific hydrophilic polymer (A-1) represented by the formula (III) is a hydrophilic polymer having, at one end thereof, a reactive group. It can be synthesized by radical polymerization of a hydrophilic monomer (ex. acrylamide, acrylic acid, or potassium salt of 3-sulfopropyl methacrylate) in the presence of a chain transfer agent (described in *Radical Polymerization Handbook* (NTS, Mikiharu Kamachi and Takeshi Endo) or Iniferter (described in *Macromolecules* 1986, 19, p 287-(Otsu)). Examples of the chain transfer agent include 3-mercaptopropionic acid, 2-aminoethanethiol hydrochloride, 3-mercaptopropanol, 2-hydroxyethyl disulfide, and 3-mercaptopropyltrimethoxysilane. The specific hydrophilic polymer may be synthesized by radical polymerization of a hydrophilic monomer (ex. acrylamide) by not using a chain transfer agent but by using a radical polymerization initiator having a reactive group (ex. carboxyl).

The mass average molecular weight of the hydrophilic polymer having, at one end thereof, a reactive group is preferably 1000000 or less, more preferably 1000 to 1000000, most preferably 2000 to 100000.

The following are specific examples of the specific hydrophilic polymer (A-1) preferably usable in the present invention but the present invention is not limited by them.

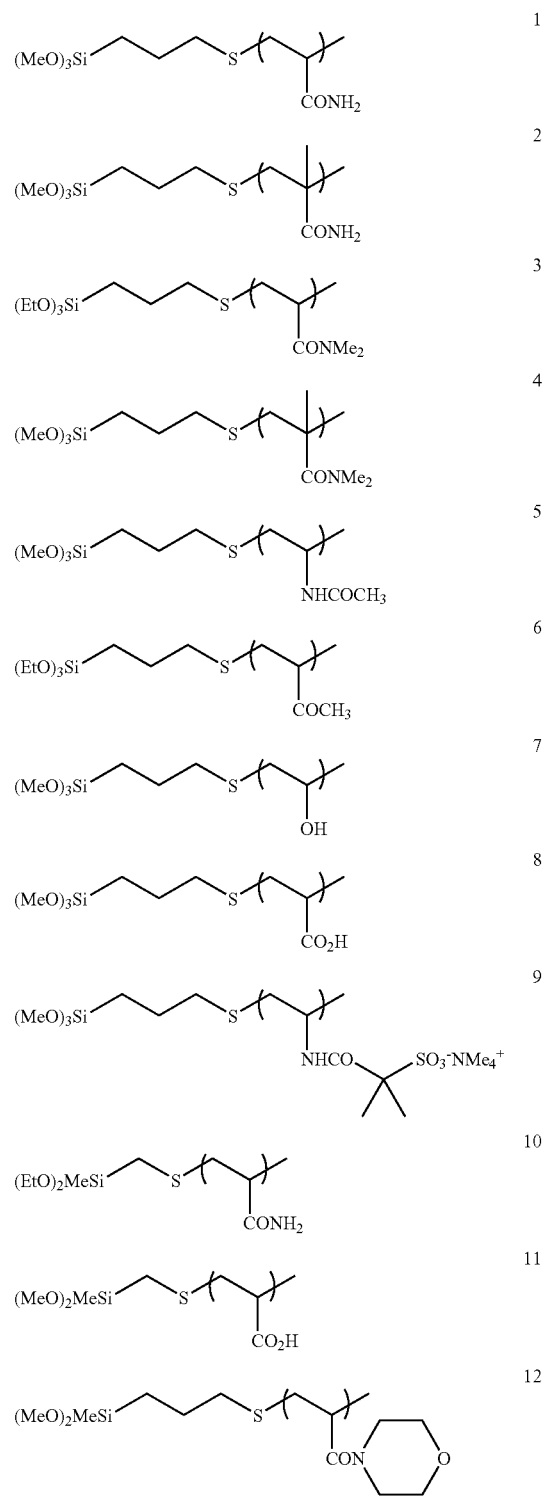

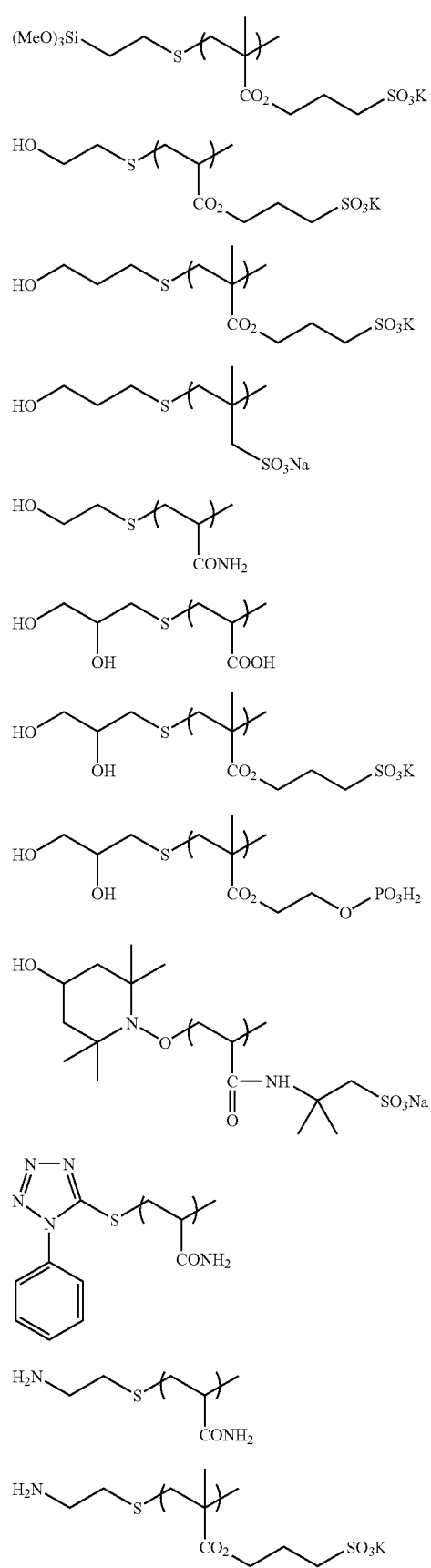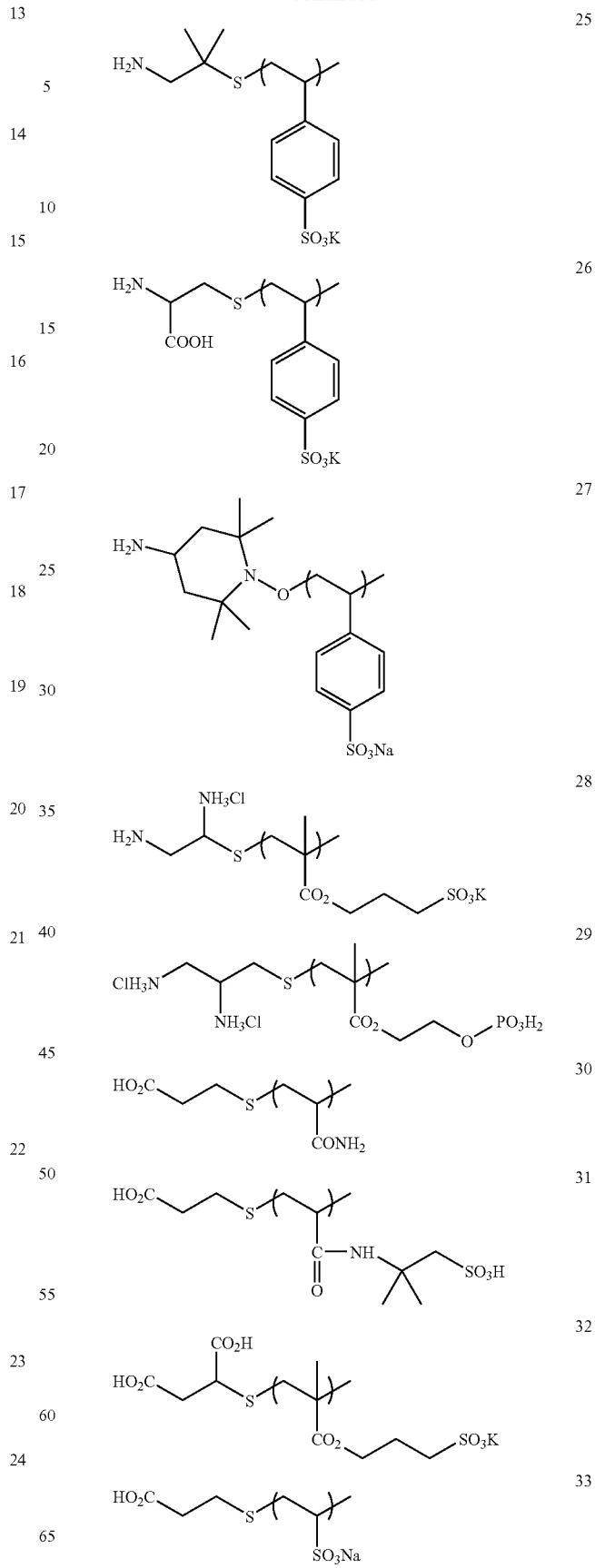

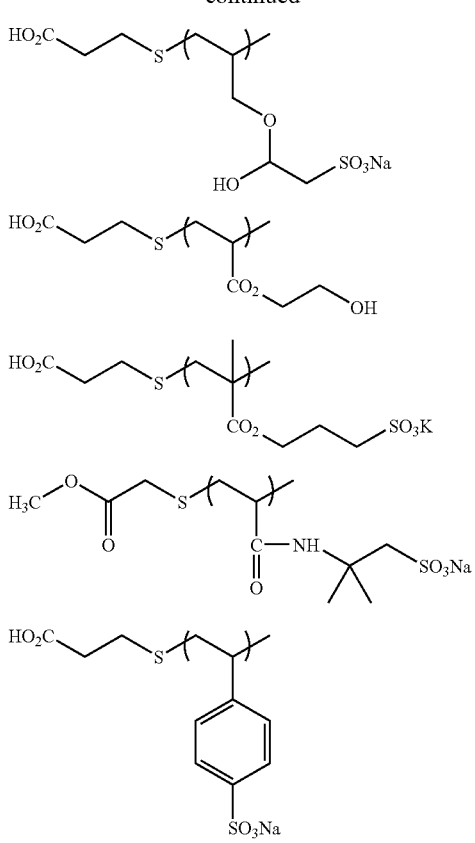

A mass ratio of (the specific ternary copolymer (A))/(the polymer having a structure represented by the formula (III)) falls within a range of preferably from 50/50 to 5/95, more preferably from 40/60 to 5/95.

[(B) Metal Complex Catalyst]

The metal complex catalysts usable for the formation of the hydrophilic layer of the present invention can promote hydrolysis and polycondensation of an alkoxide compound of a metal selected from Si, Ti, Zr, and Al and form a bond with the hydrophilic polymer. Metal complexes composed of a metal element selected from Groups 2A, 3B, 4A and 5A of the periodic table, and an oxo or hydroxy oxygen-containing compound selected from β-diketones, ketoesters, hydroxycarboxylic acids and their esters, amino alcohols and enolic active hydrogen compounds are especially preferred metal complex catalysts.

Of the constituent metal elements, preferred are elements of Group 2A such as Mg, Ca, Sr, and Ba; elements of Group 3B such as Al and Ga; elements of Group 4A such as Ti and Zr; and elements of Group 5A such as V, Nb, and Ta. They may form complexes having an excellent catalytic effect. Of those, complexes with any of Zr, Al and Ti are excellent and therefore preferred.

Examples of the oxo or hydroxy oxygen-containing compound constituting the ligand of the above metal complex usable in the invention include β-diketones such as acetylacetone (2,4-pentanedione) and 2,4-heptanedione, ketoesters such as methyl acetoacetate, ethyl acetoacetate, and butyl acetoacetate, hydroxycarboxylic acids and esters thereof such as lactic acid, methyl lactate, salicylic acid, ethyl salicylate, phenyl salicylate, malic acid, tartaric acid and methyl tartrate, ketoalcohols such as 4-hydroxy-4-methyl-2-pentanone, 4-hydroxy-2-heptanone, 4-hydroxy-4-methyl-2-pentanone, and 4-hydroxy-2-heptanone, amino alcohols such as monoethanolamine, N,N-dimethylethanolamine, N-methylmono ethanolamine, diethanolamine, and triethanolamine, enolic active compounds such as methylolmelamine, methylolurea, methylolacrylamide, and diethyl malonate, and compounds derived from acetylacetone (2,4-pentanedione) by introducing a substituent into the methyl group, the methylene group, or the carbonyl carbon thereof.

Acetylacetone or acetylacetone derivatives are preferred for the ligand. In the present invention, the term "acetylacetone derivatives" mean compounds derived from acetylacetone by introducing a substituent into the methyl group, the methylene group, or the carbonyl carbon thereof. Examples of the substituent for the methyl group of acetylacetone include linear or branched alkyl groups, acyl groups, hydroxyalkyl groups, carboxyalkyl groups, alkoxy groups, and alkoxyalkyl groups each having from 1 to 3 carbon atoms. Examples of the substituent for the methylene group of acetylacetone include carboxyl groups, and linear or branched carboxyalkyl groups and hydroxyalkyl groups, each having from 1 to 3 carbon atoms. Examples of the substituent for the carbonyl carbon of acetylacetone include alkyl groups having from 1 to 3 carbon atoms, and in this case, a hydrogen atom may be attached to the carbonyl oxygen to form a hydroxyl group.

Preferred specific examples of the acetylacetone derivative include ethylcarbonylacetone, n-propylcarbonylacetone, i-propylcarbonylacetone, diacetylacetone, 1-acetyl-1-propionyl-acetacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol. Of those, acetylacetone and diacetylacetone are especially preferred. The complex of the above acetylacetone derivative and the above metal element is a mononuclear complex having from 1 to 4 molecular ligands of the acetylacetone derivative per one metal element therein. In case where the number of the coordinable chemical bonds of the metal element is greater than the total number of the coordinable chemical bonds of the acetylacetone derivative, any ordinary ligand generally used in ordinary complexes, such as water molecule, halide ion, nitro group or ammonio group, may be coordinated in the complex.

Preferred examples of the metal complex include tris(acetylacetonato)aluminum complex, di(acetylacetonato)aluminumlaquo complex, mono(acetylacetonato)aluminum/chloro complex, di(diacetylacetonato)aluminum complex, ethylacetoacetate aluminum diisopropylate, aluminum tris(ethylacetoacetate), cyclic aluminum oxide isopropylate, tris(acetylacetonato)barium complex, di(acetylacetonato)titanium complex, tris(acetylacetonato)titanium complex, di-i-propoxy/bis(acetylacetonato)titanium complex, zirconium tris(ethylacetoacetate), and zirconium tris(benzoate) complex. They are excellent in stability in water-based coating liquids and gelation promoting effect in sol-gel reaction upon heating and drying. Of those, ethylacetoacetate aluminum diisopropylate, aluminum tris(ethylacetoacetate), di(acetylacetonato)titanium complex, and zirconium tris(ethylacetoacetate) are especially preferred.

Description of the counter salt of the above-mentioned metal complex is omitted in this specification. Regarding its kind, the counter salt may be any water-soluble salt capable of keeping the charge of the complex compound neutral. For example, nitrates, hydrohalides, sulfates, phosphates and the like capable of securing stoichiometric neutrality of the complex can be used. The behavior of the metal complex in a silica sol-gel reaction is described in detail in *J. Sol-Gel, Sci. and Tec.*, 16, 209 (1999). For its reaction mechanism, the following scheme may be presumed. Specifically, in a coating liquid, the metal complex has a coordination structure and is therefore stable. In the dehydration condensation reaction that starts in the heating and drying step after coating, the metal complex is presumed to promote crosslinking by utilizing its mechanism like that of an acid catalyst. Anyway, use of the metal complex can satisfy all of the improvement in long-term stability of the coating liquid and the film surface quality, and high hydrophilicity and high durability.

With the above-mentioned metal complex catalysts, catalysts capable of promoting hydrolysis and polycondensation of an alkoxide compound of a metal selected from Si, Ti, Zr, and Al and forming a bond with the hydrophilic polymer may be used in combination. Examples of such a catalyst include acidic compounds, e.g., hydrogen halides such as hydrochloric acid; nitric acid; sulfuric acid; sulfurous acid; hydrogen sulfide; perhydrochloric acid; hydrogen peroxide; carbonic acid; carboxylic acids such as formic acid and acetic acid; substituted carboxylic acids obtained by substituting, with another element or substituent, R of the structural formula represented by RCOOH of the carboxylic acids; and sulfonic acids such as benzenesulfonic acid, and basic compounds, e.g., ammoniacal bases such as aqueous ammonia and amines such as ethylamine and aniline.

The above metal complex catalysts are readily available as commercial products, or may be produced in any known synthesis process, for example, reaction between a metal chloride and an alcohol.

The metal complex catalyst (B) relating to the present invention is contained as a nonvolatile component in the hydrophilic-layer coating-liquid composition of the present invention in an amount of preferably from 0.1 to 50 mass %, more preferably from 0.5 to 25 mass %. The metal complex catalysts (B) may be used either singly or in combination of two or more of them.

[(C) Alkoxide Compound]

The coating composition of the present invention contains preferably an alkoxide compound (which may hereinafter be called "specific alkoxide compound") containing an element selected from Si, Ti, Zr, and Al, more preferably an alkoxide compound containing an element selected from Si, Ti, and Al. These specific alkoxide compounds are hydrolytic polymerizable compounds having, in the structure thereof, a functional group which can be hydrolyzed and polycondensed and therefore serving as a crosslinking agent. They form a firm cross-linked film having a crosslinked structure obtained by polycondensation of the specific alkoxide compounds and chemically combine with the hydrophilic polymer. The specific alkoxide compounds can be represented by the following formula (II-1) or (II-2), in which $R^8$ represents a hydrogen atom, an alkyl group, or an aryl group, $R^9$ represents an alkyl group or an aryl group; Z represents Si, Ti or Zr; m stands for an integer of from 0 to 2. When $R^8$ and $R^9$ represent an alkyl group, the number of carbon atoms is preferably from 1 to 4. The alkyl group or the aryl group may have a substituent. Examples of the substituent which can be introduced into them include halogen atoms, amino groups, and mercapto groups. The compound is a low-molecular compound, and preferably has a molecular weight of 2000 or less.

(II-1)

(II-2)

The following are specific examples of the hydrolyzable compounds represented by the formula (II-1) and the formula (II-2), but the present invention is not limited by them. When Z represents Si, in other words, when the hydrolyzable compound contains silicon, examples of the hydrolyzable compound include trimethoxysilane, tetramethoxysilane, tetraethoxysilane, tetrapropoxysilane, methyltrimethoxysilane, dimethyldimethoxysilane, γ-chloropropyltriethoxysilane, γ-mercaptopropyltrimethoxysilane, γ-aminopropyltriethoxysilane, phenyltrimethoxysilane, and diphenyldimethoxysilane. Of those, trimethoxysilane, tetramethoxysilane, tetraethoxysilane, methyltrimethoxysilane, dimethyldimethoxysilane, and phenyltrimethoxysilane are especially preferred.

When Z represents Ti, in other words, the hydrolyzable compound contains titanium, examples of the compound include trimethoxytitanate, tetramethoxytitanate, triethoxytitanate, tetraethoxytitanate, tetrapropoxytitanate, chlorotrimethoxytitanate, chlorotriethoxytitanate, ethyltrimethoxytitanate, methyltriethoxytitanate, ethyltriethoxytitanate, diethyldiethoxytitanate, phenyltrimethoxytitanate, and phenyltriethoxytitanate. When Z represents Zr, in other words, the hydrolyzable compound contains zirconium, examples of the compound include zirconates corresponding to the compounds exemplified for those containing titanium.

When the center metal is Al, in other words, the hydrolyzable compound contains aluminum, examples of the compound include trimethoxyaluminate, triethoxyaluminate, tripropoxyaluminate, and triisopropoxyaluminate.

The specific alkoxide compound is contained, as a nonvolatile component, in the hydrophilic-layer coating-liquid composition of the present invention in an amount of preferably from 0 to 80 mass %, more preferably from 0 to 70 mass %.

The specific alkoxide is easily commercially available, or may be produced in a known synthesis process, for example, a reaction between a metal chloride and an alcohol.

[(D) Compound Having, in the Molecule Thereof, at Least Two Groups Selected from Hydroxyl, Epoxy, Isocyanato, Blocked Isocyanato, and Amino Groups]

A compound (D) having, in the molecule thereof, at least two groups selected from hydroxyl, epoxy, isocyanato, blocked isocyanato, and amino groups, that is, a crosslinking agent may be added to the coating composition of the present invention in order to improve the film strength and alkali resistance.

The compound having a hydroxyl group has from about 2 to 20 carbon atoms and examples of it include diols, triols, and mixtures thereof. Examples of such a compound include polyols having from 2 to 10 carbon atoms. Preferred examples include aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, 3-methyl-1,5-pentanediol, trimethylolpropane, 2,2,4-trimethylpentane-1,3-diol, pentaerythritol, and 1,2,3,4-butanetetraol. Aromatic polyols such as bisphenol A and bis(hydroxymethyl)xylene may be used.

The compounds having an epoxy group are, for example, epoxy resins and glycidyl ethers of a polyhydric alcohol. Specific examples include various alkyl glycidyl ethers such as glycidyl ethers of a polyhydric alcohol such as polyalkylene glycol diglycidyl ether and glycerin, "EPICOAT series" (Yuka Shell Epoxy), and "EPOLIGHT series" (product of Kyoeisha CHemical).

The compounds having an isocyanato group or blocked isocyanato group are, for example, aliphatic or aromatic ones.

Specific examples of an aliphatic polyfunctional isocyanato include hexamethylene diisocyanato, dicyclohexylmethane 4,4'-isocyanato, 2,2,4,-trimethyl-1,6-diisocyanato, and isophorone diisocyanato. Their structure is, for example, a monomer, biurette, uredio, or isocyanurate type. Polyfunctional isocyanatos requiring thermosetting are block type ones. Examples of their blocking agent include methyl alcohol, ethyl alcohol, n-propyl alcohol, iso-propyl alcohol, n-butyl alcohol, sec-butyl alcohol, methyl cellosolve, ethyl cellosolve, butyl cellosolve, benzyl alcohol, furfuryl alcohol, cyclohexyl alcohol, phenol, o-cresol, m-cresol, p-cresol, p-tert-butylphenol, thymol, p-nitrophenol, and β-naphthol. In addition, oximes and active methylenes can be used. No particular limitation is imposed on the oximes and examples of them include formamidoxime, acetaldoxime, acetoxime, methyl ethyl ketoxime, diacetylmonoxime, benzophenonoxime, and cyclohexanoxime. No particular limitation is imposed on the active methylenes and examples of them include dimethyl malonate, diethyl malonate, ethyl acetoacetate, methyl acetoacetate, and acetylacetone. They may be used either singly or in combination of two or more of them.

Examples of the aromatic polyfunctional isocyanato include 2,4-tolylene diisocyanato, 2,6-tolylene diisocyanato, diphenylmethane-4,4'-diisocyasnate, xylene diisocyanato, and polymethylene-polyphenyl-polyisocyanato. The above-mentioned blocking agents can also be used for the aromatic polyfunctional isocyanato.

The compound having an amino group is, for example, a polyamine. Specific examples include ethylenediamine, 1,3-diaminopropane, 1,4-diaminobutane, 1,5-diaminopentane, triethylenetetramine, tris(2-aminoethyl)amine, tetraethylenepentamine, pentaethylenehexamine, 2,2-oxybis(ethylamine) dihydrochloride, 4,9-dioxa-1,12-dodecanediamine, and 4,7,10-trioxa-1,13-tridecanediamine.

The compound (D) having, in the molecule thereof, at least two groups selected from hydroxyl, epoxy, isocyanato, blocked isocyanato, and amino groups relating to the present invention is contained in an amount of preferably from 1 to 50 mass %, more preferably from 5 to 40 mass %, most preferably from 5 to 35 mass % in the nonvolatile component of the hydrophilic composition of the present invention from the viewpoint of curability and hydrophilicity. They may be used either singly or in combination of two or more thereof. The term "nonvolatile component" as used herein means a component obtained by removing the volatile solvent from the composition.

[Antimicrobial Agent]

An antimicrobial agent may be added to the hydrophilic-layer coating-liquid composition for imparting antimicrobial, antifungal and antialgal properties to the hydrophilic member of the present invention. Addition of a hydrophilic water-soluble antimicrobial agent is preferred in forming the hydrophilic layer. By incorporating such a hydrophilic water-soluble antimicrobial agent, a surface hydrophilic member having excellent antimicrobial, antifungal and antialgal properties can be obtained without impairing surface hydrophilicity.

As the antimicrobial agent, compounds not deteriorating the hydrophilicity of the hydrophilic member are preferred. Examples of such an antimicrobial agent include inorganic antimicrobial agents and water-soluble organic antimicrobial agents. As the antimicrobial agents, those exhibiting their antimicrobial effect against bacteria typified by *Staphylococcus aureus* and *Escherichia coli*, fungi such as mold and yeast, and other microbes existing in the environment are employed.

Examples of the organic antimicrobial agent include phenol ether derivatives, imidazole derivatives, sulfone derivatives, N-haloalkylthio compounds, anilide derivatives, pyrrole derivatives, quaternary ammonium salts, pyridine compounds, triazine compounds, benzisothiazoline compounds, and isothiazoline compounds.

Specific examples include, but not limited to, 1,2-benzisothiazolin-3-one, N-fluorodichloromethylthiophthalimide, 2,3,5,6-tetrachloroisophthalonitrile, N-trichloromethylthio-4-cyclohexene-1,2-dicarboximide, copper 8-quinolinate, bis(tributyltin) oxide, 2-(4-thiazolyl)benzimidazole (which will hereinafter be referred to as TBZ), methyl 2-benzimidazolecarbamate (which will hereinafter be referred to as BCM), 10,10'-oxybisphenoxyarsine (which will hereinafter be referred to as OBPA), 2,3,5,6-tetrachloro-4-(methylsulfone)pyridine, bis(2-pyridylthio-1-oxide)zinc (which will hereinafter be referred to as ZPT), N,N-dimethyl-N'-(fluorodichloromethylthio)-N'-phenylsulfamide (dichlorofluoroanide), poly-(hexamethylenebiguanide)hydro chloride, dithio-2-2'-bis(benzmethylamide), 2-methyl-4,5-trimethylen-4-isothiazolin-3-one, 2-bromo-2-nitro-1,3-propanediol, hexahydro-1,3-tris-(2-hydroxyethyl)-S-triazine, p-chloro-m-xylenol, and 1,2-benzisothiazolin-3-one.

These organic antimicrobial agents may be used after selection as needed in consideration of the hydrophilicity, water resistance, sublimation properties, and safety. Of the organic antimicrobial agents, 2-bromo-2-nitro-1,3-propanediol, TBZ, BCM, OBPA and ZPT are preferred in view of the hydrophilicity, the antimicrobial effect, and the cost thereof.

Examples of the inorganic antimicrobial agent include mercury, silver, copper, zinc, iron, lead, and bismuth, as listed in order of the intensity of their antimicrobial effect. For example, the agents have a metal or metal ion of silver, copper, zinc, or nickel supported on a silicate carrier, a phosphate carrier, an oxide, glass, potassium titanate, or an amino acid. Examples include, but not limited to, zeolite based antimicrobial agents, calcium silicate based antimicrobial agents, zirconium phosphate based antimicrobial agents, calcium phosphate based antimicrobial agents, zinc oxide based antimicrobial agents, soluble glass based antimicrobial agents, silica gel based antimicrobial agents, active charcoal based antimicrobial agents, titanium oxide based antimicrobial agents, titania based antimicrobial agents, organometal based antimicrobial agents, ion exchanger ceramic based antimicrobial agents, layered phosphate-quaternary ammonium salt based antimicrobial agents, and antimicrobial stainless.

Natural antimicrobial agents are, for example, chitosan, that is, a basic polysaccharide available through hydrolysis of chitin contained in shells of crabs and lobsters.

In the invention, Nikko's "Holon Killer Beads Celler, trade name" composed of an amino metal having a metal compounded on both sides of an amino acid is preferred.

Such antimicrobial agents are not evaporative and readily undergo interaction with the polymer or the crosslinking agent component in the hydrophilic layer, and undergo molecular dispersion or solid dispersion stably. They are easily exposed effectively on the surface of the hydrophilic layer. In addition, even when wetted with water, they do not dissolve out and can keep their effect for a long period of time. Further, they have no influence on human bodies. Moreover, they can be dispersed stably in the hydrophilic layer or the coating liquid and do not cause deterioration of the hydrophilic layer or the coating liquid.

Of the above-mentioned antimicrobial agents, silver-based inorganic antimicrobial agents and water-soluble organic antimicrobial agents are most preferred because they have a great antimicrobial effect. In particular, silver zeolite obtained by having silver supported on zeolite which is a silicate carrier, an antimicrobial agent obtained by having silver supported on silica gel, 2-bromo-2-nitro-1,3-propanediol, TPN, TBZ, BCM, OBPA, and ZPT are preferred. Especially preferred commercially available silver zeolite-based antimicrobial agents are "Zeomic" manufactured by Shinagawa Fuel, "Sylwel" manufactured by Fuji Silysia Chemical, and "Bactenon" manufactured by Japan Electronic Materials. In addition, "Novalon" manufactured by Toagosei and "Atomy Ball" manufactured by Shokubai Kasei Kogyo, each obtained by having silver supported on an inorganic ion-exchange ceramic, and a triazine-based antimicrobial agent, "San-ai Back P" are also preferred.

The content of the antimicrobial agent is generally from 0.001 to 10 mass %, preferably from 0.005 to 5 mass %, more preferably from 0.01 to 3 mass %, especially preferably from 0.02 to 1.5 mass %, most preferably from 0.05 to 1 mass %. When the content is 0.001 mass % or greater, the agent may effectively exhibit its antimicrobial effect. When it is 10 mass % or less, the agent does not deteriorate the hydrophilicity of the composition, and does not worsen the long-term storage stability, and in addition, it has no adverse effect on the antifouling and antifogging properties of the composition.

[Inorganic Particles]

The hydrophilic coating composition of the invention may contain inorganic particles for improving the hydrophilicity, preventing cracks of the film, and improving the strength of the film. Preferred examples of the inorganic particles include silica, alumina, magnesium oxide, titanium oxide, magnesium carbonate, and calcium alginate and mixtures thereof.

The inorganic particles have an average particle size of preferably from 5 nm to 10 μm, more preferably from 0.5 to 3 μm. Within this range, the particles are stably dispersed in the hydrophilic layer, thereby sufficiently keeping the film strength of the hydrophilic layer, and providing a hydrophilic member having high durability and excellent hydrophilicity.

Of the above-mentioned inorganic particles, colloidal silica dispersion is especially preferred and it is readily available as a commercial product.

The content of the inorganic fine particles is preferably 80 mass % or less, more preferably 50 mass % or less relative to the total solid content of the hydrophilic layer.

[Other Components]

Various additives usable for the hydrophilic coating composition of the present invention if necessary will next be described.

1) Surfactant

A surfactant may be added to the hydrophilic-layer forming coating liquid of the hydrophilic member of the present invention.

As the surfactant, those described in Japanese Patent Laid-Open Nos. Sho 62-173463 and Sho 62-183457 can be used. Examples include anionic surfactants such as dialkylsulfosuccinates, alkylnaphthalenesulfonates, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. Organic fluoro compounds may be used instead of these surfactants. The organic fluoro compounds are preferably hydrophobic. Examples of the organic fluoro compounds include fluorine surfactants, fluorine compounds in oil form (ex. fluorine oils) and fluorine compound resins in solid form (ex. ethylene tetrafluoride resin). Examples include those described in Japanese Patent Publication No. Sho 57-9053 (from eighth to seventeenth column) and Japanese Patent Laid-Open No. Sho 62-135826.

2) UV Absorbent

In the present invention, a UV absorbent may be added from the standpoint of improvement in the weather resistance and durability of the hydrophilic member.

Examples of the UV absorbent include benzotriazole compounds as described in Japanese Patent Laid-Open Nos. Sho 58-185677, Sho 61-190537, Hei 2-782, Hei 5-197075, and Hei 9-34057; benzophenone compounds as described in Japanese Patent Laid-Open Nos. Sho 46-2784 and Hei 5-194483, and U.S. Pat. No. 3,214,463; cinnamic acid compounds as described in Japanese Patent Publication Nos. Sho 48-30492 and Sho 56-21141, Japanese Patent Laid-Open No. Hei 10-88106; triazine compounds as described in Japanese Patent Laid-Open Nos. Hei 4-298503, Hei 8-53427, Hei 8-239368, and Hei 10-182621, and International Patent Publication No. Hei 8-501291; compounds described in Research Disclosure No. 24239; and compounds typified by stilbene compounds and benzoxazole compounds and capable of absorbing ultraviolet rays and emitting fluorescence, so-called fluorescent brighteners. An amount of the surfactant to be added may be determined as needed depending on its using purpose, but in general, it is preferably from 0.5 to 15 mass % in terms of the solid content.

3) Antioxidant

An antioxidant may be added to the hydrophilic-layer forming coating liquid in order to improve the stability of the hydrophilic member of the invention. Examples of antioxidant include those described in European Published Patent Application Nos. 223739, 309401, 309402, 310551, 310552, and 459416, German Published Patent Application Nos. 3435443, Japanese Patent Laid-Open No. Sho 54-262047, Sho 63-113536, Sho 63-163351, Hei 2-262654, Hei 2-71262, Hei 3-121449, Hei 5-61166, and Hei 5-119449, and U.S. Pat. Nos. 4,814,262 and 4,980,275.

An amount of the antioxidant to be added may be determined as needed depending on its using purpose but it is preferably from 0.1 to 8 mass % in terms of the solid content thereof in the composition.

4) Solvent

Addition of an organic solvent to the hydrophilic-layer forming coating liquid in an adequate amount is also effective in order to enable formation of a uniform film on a substrate when the hydrophilic layer of the hydrophilic member of the present invention is formed.

Examples of the solvent include ketone solvents such as acetone, methyl ethyl ketone, and diethyl ketone; alcohol solvents such as methanol, ethanol, 2-propanol, 1-propanol, 1-butanol, and tert-butanol; chlorine solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; and glycol ether solvents such as ethylene glycol monomethyl ether and ethylene glycol dimethyl ether.

In this case, addition of the solvent within the range not causing any VOC (volatile organic solvent)-related problems is effective and an amount of the solvent is preferably from 0 to 50 mass %, more preferably from 0 to 30 mass % based on the coating liquid to be used in forming the hydrophilic member.

5) High-Molecular Compound

Various high-molecular compounds may be added to the hydrophilic-layer forming coating liquid of the hydrophilic member of the present invention in order to control the physical properties of the hydrophilic layer without impairing the hydrophilicity of the layer. Examples of the high-molecular compounds include acrylic polymers, polyvinyl alcohol resins, polyvinyl butyral resins, polyurethane resins, polyamide resins, polyester resins, epoxy resins, phenolic resins, polycarbonate resins, polyvinyl formal resins, shellac, vinyl resins, acrylic resins, rubber resins, waxes, and other natural resins. Two or more of these compounds may be used in combination. Of those, vinyl copolymers available through copolymerization of acrylic monomers are preferred. As a copolymerization composition of a high molecular binder, copolymers having, as a structural unit thereof, a "carboxyl-containing monomer", "alkyl methacrylate" or "alkyl acrylate" are preferred.

In addition, if desired, the composition may also contain, for example, a leveling additive, a mat agent, a wax for controlling the physical properties of the film, and a tackifier for improving the adhesion properties of the film to a substrate within a range not impairing the hydrophilicity of the film.

Specific examples of the tackifier include high-molecular-weight adhesive polymers described in Japanese Patent Laid-Open No. 2001-49200, pp. 5-6 (e.g., copolymers composed of an ester of (meth)acrylic acid and an alcohol having an alkyl group with from 1 to 20 carbon atoms, an ester of (meth)acrylic acid and an alicyclic alcohol having from 3 to 14 carbon atoms, and an ester of (meth)acrylic acid and an aromatic alcohol having from 6 to 14 carbon atoms); and low-molecular-weight tackifying resins having a polymerizable unsaturated bond.

[Substrate]

Although no particular limitation is imposed on the substrate to be used in the present invention, glasses, plastics, metals, ceramics, woods, stones, cements, fibers, fabrics, paper and leather, and combinations or laminations thereof may be used preferably. Of these, glass, plastics, stainless, and aluminum substrates are especially preferred.

As the glass substrate, any of soda glass, lead glass and borosilicate glass may be used. Also, according to the purpose, float sheet glass, figured glass, frosted sheet glass, mesh glass, wired glass, tempered glass, laminated glass, double glass, vacuum glass, security glass, or highly insulating low-E double glass may be used. Furthermore, the hydrophilic layer may be provided directly on the green sheet glass, but one surface or both surfaces of the glass substrate may be subjected to a surface hydrophilization treatment by oxidation method, surface roughening method, or the like, for the purpose of enhancing the adhesion properties of the hydrophilic layer. Examples of the oxidation method include a corona discharge treatment, a glow discharge treatment, a chromic acid treatment (wet), a flame treatment, a hot air treatment, and an ozone/ultraviolet irradiation treatment. As for the surface roughening method, the surface may also be mechanically roughened by sandblasting, brush polishing or the like.

Although no particular limitation is imposed on the plastic substrate to be used in the invention, examples of it include films or sheets formed of polyester, polyethylene, polypropylene, cellophane, triacetyl cellulose, diacetyl cellulose, acetyl cellulose butyrate, polyvinyl chloride, polyvinylidene chloride, polyvinyl alcohol, ethylene vinyl alcohol, polystyrene, polycarbonate, polymethylpentene, polysulfone, polyether ketone, acryl, nylon, fluororesin, polyimide, polyetherimide, or polyethersulfone. Of these, a polyester film such as polyethylene terephthalate or polyethylene naphthalate is preferred. Incidentally, a plastic substrate with excellent transparency is preferred from an optical viewpoint, but a translucent or printed substrate is used depending on the usage. The thickness of the plastic substrate varies according to the other party stacked thereon. For example, in use for a portion having many curves, a thin substrate is preferred and a plastic substrate having a thickness of approximately from 6 to 50 μm is used. Also, in use for a flat plane or a portion requiring strength, a plastic substrate of from 50 to 400 μm in thickness is used.

In addition, metals, particularly stainless and aluminum, ceramics, concretes, fibers, papers, and leather, and combinations or laminations thereof are preferred. Stainless and aluminum substrates are especially preferable substrates.

One surface or both surfaces of the substrate may be subjected to a surface hydrophilization treatment by oxidation method, surface roughening method, or the like, for the purpose of enhancing the adhesion properties between the substrate and the hydrophilic layer. Examples of the oxidation method include a corona discharge treatment, a glow discharge treatment, a chromic acid treatment (wet), a flame treatment, a hot air treatment, and an ozone/ultraviolet irradiation treatment. As for the surface roughening method, the surface may also be mechanically roughened by sandblasting, brush polishing or the like.

[Undercoat Layer]

In the present invention, one or two or more undercoat layers may be formed between the substrate and the hydrophilic layer.

The undercoat layer is preferably obtained by hydrolysis and polycondensation of a composition containing at least an alkoxide compound having an element selected from Si, Ti, Zr, and Al and a nonvolatile catalyst.

The undercoat layer obtained by hydrolysis and polycondensation of a composition having at least an alkoxide compound containing an element selected from Si, Ti, Zr, and Al and a nonvolatile catalyst has a crosslinked structure. Such a crosslinked structure formed by hydrolysis and polycondensation of an alkoxide compound is called "sol-gel crosslinked structure" as needed in the present invention.

Examples of the alkoxide compound containing an element selected from Si, Ti, Zr, and Al are similar to those described above. Of these, an alkoxide of Si is preferred from the standpoint of reactivity and easy availability. More specifically, compounds used for a silane coupling agent are preferably employed.

The nonvolatile catalyst used for the undercoat layer is a catalyst other than that having a boiling temperature less than 20° C., in other words, a catalyst having a boiling temperature of 20° C. or greater or having no boiling temperature (including a catalyst causing no phase change such as thermal decomposition).

Although the nonvolatile catalyst to be used in the present invention is not particularly limited, examples of it include metal complexes (also called "metal chelate compounds") and silane coupling agents. Acids and alkalis are also used preferably as the catalyst in the present industry and these acids and alkalis can also be used without particular limitation if they have a boiling temperature of 20° C. or greater. For example, hydrochloric acid having a boiling temperature of −83° C. is excluded but nitric acid having a boiling temperature of 121° C. or phosphoric acid having a decomposition temperature of 213° C. can be used as the nonvolatile catalyst in the present invention.

Examples of the metal complexes are similar to those described above.

Although the silane coupling agents to be used in the nonvolatile catalyst are not particularly limited, those having a functional group showing acidity or alkalinity can be used. Specific examples include acidic functional groups such as peroxo acid, carboxylic acid, carbohydrazonic acid, carboximic acid, sulfonic acid, sulfinic acid, sulfenic acid, selnoic acid, selenic acid, selenenic acid, and telluroic acid, and alkali metal salts thereof, and basic functional groups such as an amino group.

The undercoat layer can be formed by applying the composition having at least the alkoxide compound and the nonvolatile catalyst onto the substrate and heating and drying to cause hydrolysis and polycondensation of the composition. Although the heating temperature and heating time for forming the undercoat layer are not particularly limited insofar as they enable to remove the solvent in the sol solution and form a strong film, the heating temperature not greater than 150° C. and heating time within one hour are preferred from the standpoint of production aptitude.

The undercoat layer can be formed by a known application method and no particular limitation is imposed on it. For example, a spray coating method, a dip coating method, a flow coating method, a spin coating method, a roll coating method, a film applicator method, a screen printing method, a bar coater method, a brush coating method, a sponge coating method can be employed.

The undercoat layer thus formed may still contain the nonvolatile catalyst without losing its activity. In particular, due to existence of the catalyst even in its surface, the adhesion properties at the interface between the undercoat layer and the hydrophilic layer become extremely high.

The adhesion properties at the interface between the undercoat layer and the hydrophilic layer can be made higher by etching the undercoat layer with plasma or mixing metal particles therein to form minute irregularities on the undercoat layer.

As the raw material of the undercoat layer, hydrophilic resins and water dispersible latexes can also be used.

Examples of the hydrophilic resin include polyvinyl alcohol (PVA), cellulose resins [e.g., methyl cellulose (MC), hydroxyethyl cellulose (EEC), and carboxymethyl cellulose (CMC)], chitins, chitosans, starch, ether bond-having resins [e.g., polyethylene oxide (PEO), polyethylene glycol (PEG), and polyvinyl ether (PVE)], carbamoyl-containing resins [e.g., polyacrylamide (PAAM) and polyvinylpyrrolidone (PVP)]. They also include carboxyl-containing polyacrylates, maleic acid resins, alginates, and gelatins.

Of the above, least one selected from polyvinyl alcohol resins, cellulose resins, ether-bond-having resins, carbamoyl-containing resins, carboxyl-containing resins and gelatins is preferred, with polyvinyl alcohol (PVA) resins and gelatins being especially preferred.

Examples of the water dispersible latexes include acrylic latexes, polyester latexes, NBR resins, polyurethane latexes, polyvinyl acetate latexes, SBR resins, and polyamide latexes. Of these, acrylic latexes are preferred.

The hydrophilic resins or the water dispersible latexes may be used either singly or in combination of two or more thereof. Alternatively, the hydrophilic resin and the water dispersible latex may be used in combination.

A crosslinking agent capable of crosslinking the hydrophilic resin or the water dispersible latex may be used.

As the crosslinking agent usable in the present invention, known crosslinking agents capable of forming a crosslink by heat can be used. Typical thermal crosslinking agents are described in "Handbook of Crosslinking Agents" by Shinzo Yamashita and Tohsuke Kaneko, published by Taisei-sha (1981). No particular limitation is imposed on the crosslinking agent usable in the present invention insofar as it has at least two functional groups and is capable of effectively crosslinking the hydrophilic resin or the water dispersible latex. Specific examples of the thermal crosslinking agent include polycarboxylic acids such as polyacrylic acid; amine compounds such as polyethyleneimine; polyepoxy compounds such as ethylene or propylene glycol diglycidyl ether, tetraethylene glycol diglycidyl ether, nonaethylene glycol diglycidyl ether, polyethylene or polypropylene glycol glycidyl ether, neopentyl glycol diglycidyl ether 1,6-bexanediol diglycidyl ether, trimethylolpropane triglycidyl ether, and sorbitol polyglycidyl ether; polyaldehyde compounds such as glyoxal and terephthalaldehyde; polyisocyanate compounds such as tolylene diisocyanate, hexamethylene diisocyanate, diphenylmethane isocyanate, xylylene diisocyanate, polymethylene polyphenyl isocyanate, cyclohexyl diisocyanate, cyclohexanephenylene diisocyanate, naphthalene-1,5-diisocyanate, isopropylbenzene-2,4-diisocyanate, polypropylene glycol/tolylene diisocyanate adducts; block polyisocyanate compounds; silane coupling agents such as tetraalkoxysilanes; metal crosslinking agents such as aluminum, copper or iron(III) acetylacetonate; and polymethylol compounds such as trimethylolmelamine and pentaerythritol. Of these thermal crosslinking agents, water-soluble ones are preferred from the standpoint of easy preparation of coating solutions and prevention of the deterioration of hydrophilicity of the resulting hydrophilic layer.

The total amount of the hydrophilic resin and/or the water-dispersible latex in the undercoat layer is preferably from 0.01 to 20 g/m$^2$, more preferably from 0.1 to 10 g/m$^2$.

[Layer Constitution Upon Using the Hydrophilic Member]

When the hydrophilic member of the present invention is used while expecting the exhibition of its antifouling and/or antifogging effect, another layer may be added thereto as needed, depending on its object, shape and service site. The layer constitution to be added as needed will hereinafter be described.

1) Adhesive Layer:

When the hydrophilic member of the present invention is used after attached to another substrate, an adhesive which is a pressure-sensitive adhesive is preferably used as an adhesive layer on the backside of the substrate. As the adhesive, those ordinarily used for adhesive sheets such as rubber adhesive, acrylic adhesive, silicone adhesive, vinyl ether adhesive and styrene adhesive can be used.

When an optically transparent adhesive is required, an adhesive for optical use is selected. When a colored, semi-transparent or matted pattern is needed, a pattern may be drawn on the substrate, or a dye or organic or inorganic particles may be added to adhesives to produce such an effect.

When a tackifier is needed, one or more tackifying resins such as rosin resins, terpene resins, petroleum resins, and styrene resins, and hydrogenated products thereof may be used either singly or as a mixture.

The adhesive to be used in the present invention has an adhesive powder as strong as 200 g/25 mm or greater, preferably 300 g/25 mm or greater, more preferably 400 g/25 mm or greater. The adhesive power as referred to herein is determined according to the 180° peel test in accordance with JISZ0237.

2) Release Layer

When the hydrophilic member of the present invention has the above adhesive layer, it may further have a release layer. The release layer preferably contains a release agent for having release properties. Examples of the release agent include silicone release agents made of polyorganosiloxane, fluorine-containing compounds, long chain alkyl-modified polyvinyl alcohols, and long chain alkyl-modified polyethyleneimines. Additional examples include, as well as various release agents such as hot-melt release agents and monomer release agents capable of curing releasable monomers through radical polymerization, cationic polymerization, polycondensation, or the like, copolymer resins such as acrylic-silicone copolymer resins, acrylic-fluorine copolymer resins, and urethane-silicone-fluorine copolymer resins and resin blends such as silicone resin/acrylic resin blend, fluororesin/acrylic resin blend. Alternatively, the release layer may be a hardcoat release layer available by curing a curable composition containing a fluorine atom and/or a silicon atom and a compound containing an active-energy-ray polymerizable-group.
3) Other Layers A protective layer may be formed on the hydrophilic layer. The protective layer has a function of preventing the hydrophilic surface from being scratched during handling, transportation or storage or a function of preventing deterioration of the hydrophilicity of the layer which will otherwise occur due to adhesion of a dirt thereto. As the protective layer, the hydrophilic polymer layer used for the above release layer or undercoat layer is usable. The protective layer may be peeled off after the hydrophilic member has been adhered to a suitable substrate.

[Form of Structure]

The structure having the hydrophilic layer of the present invention may be provided in the form of a sheet, a roll or a ribbon, or may be provided after cut for the purpose of attaching it to a suitable substrate.

[Surface Free Energy]

The degree of hydrophilicity of the surface of the hydrophilic layer is generally determined based on a water contact angle. However, on the surface having extremely high hydrophilicity as in the invention, the water contact angle may be not greater than 10°, even not greater than 5°; and therefore, this method is not always suited for comparing the degree of hydrophilicity among hydrophilic layers. On the other hand, for detailed evaluation of the degree of hydrophilicity of a solid surface, there is known a method of measuring surface free energy. Various methods have been proposed for it. As one example, in the present invention, a Zisman plotting method is employed for measuring surface free energy. Described specifically, the method is as follows. While utilizing the property of an aqueous solution of an inorganic electrolyte such as magnesium chloride that its surface tension increases with the concentration of the aqueous solution, the contact angle in air at room temperature is measured. The surface tension of the aqueous solution is plotted along the abscissa and the contact angle in terms of $\cos \theta$ is plotted along the ordinate. The data of the aqueous solutions having various concentrations are plotted. The graph gives a linear relationship. The surface tension that gives $\cos \theta = 1$, that is, contact angle=0° is defined as the surface free energy of the solid. The surface tension of water is 72 mN/m, and it may be said that the greater the surface free energy, the higher the hydrophilicity.

The hydrophilic layer having a surface free energy, as measured in such a manner, within a range of from 70 mN/m to 95 mN/m, preferably from 72 mN/m to 93 mN/m, more preferably from 75 mN/m to 90 mN/m is excellent in hydrophilicity and exhibits good performance.

When the hydrophilic member having the hydrophilic coating film of the present invention formed thereon is used for windowpanes (used for windowpanes or adhered thereto), its transparency is important for securing view through it. The hydrophilic coating film of the invention has excellent transparency, and even though it is thick, its transparency is not impaired. Accordingly, the hydrophilic coating film of the present invention may satisfy both transparency and durability.

The thickness of the hydrophilic coating film of the present invention is preferably from 0.01 to 100 µm, more preferably from 0.05 to 50 µm, most preferably from 0.1 to 20 µm. Film thicknesses of 0.01 µm or greater are preferred because they provide sufficient hydrophilicity and durability. Film thicknesses not greater than 100 µm are also preferred because the problems in film forming property such as cracking do not occur.

Transparency is evaluated by measuring light transmission of a visible light range (400 nm to 800 nm) with a spectrophotometer. The light transmission is preferably from 100% to 70%, more preferably from 95% to 75%, most preferably from 95% to 80% of range. Within this range, the hydrophilic member having the hydrophilic coating film can be applied to a various application without interrupting a filed of view.

The dry weight of the hydrophilic coating film of the present invention is preferably from 0.01 g/m$^2$ to 100 g/m$^2$, more preferably from 0.05 g/m$^2$ to 50 g/m$^2$, most preferably from 0.1 g/m$^2$ to 20 g/m$^2$. Dry weights of 0.01 g/m$^2$ or greater are preferred because they provide sufficient hydrophilicity and durability Dry weights of not greater than 100 g/m$^2$ are also preferred because the problems in film forming property such as cracking do not occur.

A surface hydrophilic layer of the hydrophilic member of the present invention can be obtained by applying the hydrophilic-layer forming coating-liquid composition to a proper substrate, followed by heating and drying. Although the heating temperature and heating time for forming the hydrophilic layer are not particularly limited insofar as they enable to remove the solvent from the sol solution and thereby form a strong film, heating temperature not greater than 150° C. and heating time within 1 hour are preferred from the standpoint of production aptitude.

The hydrophilic member can be formed by a known application method and no particular limitation is imposed on it. For example, a spray coating method, a dip coating method, a flow coating method, a spin coating method, a roll coating method, a film applicator method, a screen printing method, a bar coater method, a brush coating method, or a sponge coating method can be used.

The hydrophilic member of the present invention can be used for, when an antifogging effect is expected, transparent materials, for example, transparent glass substrates or transparent plastic substrates, lenses, prisms, mirrors, and the like.

As glass, any of soda glass, lead glass, borosilicate glass, and the like may be used. Depending on their use, float sheet glass, figured glass, frosted sheet glass, meshed glass, wired glass, reinforced glass, laminate glass, pair glass, vacuum glass, security glass, and high thermal-insulation low-E pair glass can be used.

Members having an antifogging effect can be applied to mirrors such as rearview mirrors for vehicles, mirrors in bathrooms, mirrors in washrooms, mirrors for dental use, and road mirrors; lenses such as eyeglass lenses, optical lenses, camera lenses, endoscope lenses, lenses for illumination, lenses for semiconductors, and lenses for duplicators; prisms; windowpanes for buildings or control towers; glass for other building materials; windowpanes for various vehicles, such as cars, railroad carriages, airplanes, ships, midget submarines, snowmobiles, ropeway gondolas, and gondolas in amusement parks; windshield glass for various vehicles, such as cars, railroad carriages, airplanes, ships, midget submarines, snowmobiles, motorcycles, ropeway gondolas, and gondolas in amusement parks; protector goggles, sports goggles, protector mask shields, sports mask shields, helmet shields, and glass cases for frozen food display; cover glass for metering instruments; and films to be attached to the surface of the above articles. The most preferred application is glass for cars and building materials.

When the surface hydrophilic member of the invention is expected to exhibit an antifouling effect, any of metals, ceramics, aluminum, woods, stones, cements, concretes, fibers, textiles, and papers, and combinations and laminations thereof as well as glasses and plastics can be used as the substrate.

Examples of applications to which the member having an antifouling effect can be applied include building materials, building exterior materials such as siding walls and roofs, building interiors, window frames, windowpanes, structural members, exteriors and paints of vehicles such as cars, railroad carriages, airplanes, ships, bicycles, and motorcycles, exteriors of machinery and articles, dustproof covers and paints, traffic signs, various display devices, advertising towers, road noise barriers, railroad noise barriers, bridges, exteriors and paints of guardrails, interiors and paints of tunnels, insulators, solar cell covers, heat collector covers for solar water heaters, PVC greenhouses, covers for vehicle lights, housing equipment, toilets, bathtubs, washstands, lighting instruments, lighting instrument covers, kitchen utensils, dishes, dish washers, dish driers, sinks, cooking ovens, kitchen hoods, ventilation fans, and films to be attached to the surface of the above articles.

They further include signboards, traffic signs, noise barriers, PVC greenhouses, insulators, covers for vehicles, tent materials, reflectors, sliding doors, screen doors, solar cell covers, heat collector covers for solar water heaters, street lamps, pavements, outdoor lightings, stone materials/tiles for artificial waterfalls/artificial fountains, bridges, greenhouses, external wall materials, sealers between walls or glasses, guardrails, balconies, vending machines, outdoor units of air conditioners, outdoor benches, various display devices, shutters, tollbooths, rate boxes, roof gutters, protecting covers for vehicle lamp, dustproof covers and paints, paints of machinery and articles, exteriors and paints of advertising towers, structural members, housing equipment, toilets, bathtubs, washstands, lighting instruments, kitchen utensils, dishes, dish driers, sinks, cooking ovens, kitchen hoods, ventilation fans, window rails, window frames, tunnel interior walls, tunnel interior lightings, window sashes, heat radiation fins for heat exchangers, pavements, mirrors for bathrooms and washrooms, ceilings for PVC greenhouses, washing stands, car bodies, indoor units of air conditioners, outdoor units of air conditioners, and films and emblems which can be attached to these articles.

The member is also applicable to roof materials, antenna and power transmission lines in snowy districts. When it is applied to them, it may exhibit an excellent snow-accretion preventing effect.

The hydrophilic composition of the present invention is preferably applied to a fin material made of aluminum to form a hydrophilic film thereon and the resulting fin material is preferably used for a heat exchanger of an air conditioner.

The air conditioner is a temperature-controlling, humidity-controlling and conditioning apparatus and it means an air conditioning apparatus having both a cooler and a heater in combination. It is a cooling and heating apparatus and a room air conditioner, a package air conditioner, and a car air conditioner are collectively called "air conditioner".

A heat exchanger is an apparatus for transferring a thermal energy of a high-temperature fluid to a low-temperature fluid. It employs, for example, a direct contact system or a system using a partition or thermal accumulator. It can be used for a heater, cooler, evaporator, condenser, or the like. Examples of the application of heat exchangers include room coolers, air conditioners, construction machine oil coolers (cooling an oil for hydraulically actuated construction machine), car radiators (preventing overheating or overcooling of an engine to keep the temperature constant), condensers (cooling a high pressure gas, which has become hot as a result of compression heat, with a front-surface cooling wind and return it to a liquid condition), evaporators (included in apparatuses related to an air conditioner and serving to evaporate a gas of a refrigerant and decrease the surrounding temperature), intercoolers, and automobile heaters. The heat exchanger is a part of an air conditioner and is made of a pipe for transferring a heat medium and a fin stock for absorbing heat from the air or diffusing heat in the heat medium. The fin stocks have a hydrophilic surface formed in order to prevent formation of a bridge between fin pitches due to dew condensation water on the surface of the fin stocks. In recent years, there has been a strong demand for the development of fin stocks capable of maintaining hydrophilicity for a long period of time even under an environment where pollutants exist (Reference: "Special Function Coating Technology", p 215-226, 2007, published by CMC, Japanese Patent Laid-Open No. 2003-201577).

Fin stocks are made of aluminum or an aluminum alloy. The aluminum materials having an aluminum purity of 99% or greater, thickness not greater than 150 μm, and surface roughness of from 0.1 to 0.4 μm are preferred. Examples of the aluminum to be used for the fin stock include that having a degreased surface and aluminum plates subjected to chemical conversion treatment if necessary. The fin stocks made of aluminum and having a surface subjected to chemical conversion treatment are preferred from the standpoint of adhesion properties and corrosion resistance of a hydrophilized film. An example of the chemical conversion treatment is chromate treatment. Typical examples of chromate treatment include alkali salt-chromate methods (such as B.V. method, M.B.V. method, E.W. method, Alrock method, and Pylumin method), a chromic acid method, a chromate method and a phosphoric acid-chromic acid method, and non-washing coat-type treatment with a composition composed mainly of chromium chromate.

Examples of a thin aluminum plate usable for the fin material of a heat exchanger include pure aluminum plates compliant with JIS, such as 1100, 1050, 1200 and 1N30, Al—Cu alloy plates compliant with JIS, such as 2017 and 2014, Al—Mn alloy plates compliant with JIS, such as 3003 and 3004, Al—Mg alloy plates compliant with JIS, such as 5052 and 5083, and Al—Mg—Si alloy plates compliant with JIS, such as 6061. And these thin plates may have either sheeted or coiled shape.

In addition, known techniques (as disclosed in Japanese Patent Laid-Open Nos. 2002-106882 and 2002-156135) can be applied to the heat exchangers and air conditioners according to the invention, and the invention is not particularly limited by them.

EXAMPLES

The present invention will hereinafter be described in detail by examples but the present invention is not limited thereby.

Example 1

A float sheet glass (thickness: 2 mm), a most popular transparent sheet glass, was prepared, and the surface of the sheet glass was made hydrophilic through $UV/O_3$ treatment for 10 minutes. Hydrophilic-layer coating liquid (1) having the following composition was then bar-coated onto it and dried in an oven at 100° C. for 10 minutes to form a hydrophilic layer having a dry weight of 0.1 g/m², thereby forming a hydrophilic member. The hydrophilic member thus obtained had a surface free energy of 82 mN/m and thus had a highly hydrophilic surface. It had a visible light transmissivity of 87% (as measured using a "Hitachi spectrophotometer U3000").

<Hydrophilic Layer Coating Liquid (1)>

| | |
|---|---|
| So-gel preparation solution (1) described below | 500 g |
| A 5 mass % aqueous solution of Anionic surfactant (1) described below | 30 g |
| Purified water | 450 g |

[Structure of Anionic surfactant (1): NaO$_3$S-CH(CO$_2$-2-ethylhexyl)-CH$_2$-CO$_2$-2-ethylhexyl]

Anionic surfactant (1)

<Sol-Gel Preparation Solution (1)>

The solution was prepared by mixing 8 g of tetramethoxysilane (product of Tokyo Chemical Industry) and 4 g of a specific ternary copolymer (Exemplified compound (3), Log P of a hydrophilic group unit=−0.61) in 200 g of ethyl alcohol, 10 g of acetylacetone, 10 g of tetraethyl orthotitanate, and 100 g of purified water and then stirring the resulting mixture at room temperature for 2 hours, <Synthesis of Specific Ternary Copolymer (3)>

A 500-ml three-necked flask was charged with 50 g of acrylamide, 12 g of 2-hydroxyethyl acrylate, 55 g of (triethoxysilyl)propyl acrylamide, and 350 g of 1-methoxy-2-propanol, followed by the addition of 2.8 g of dimethyl 2,2'-azobis(2-methylpropionate) under a nitrogen stream of 80° C. The reaction mixture was maintained at the same temperature while stirring for 6 hours and then cooled to room temperature. The reaction mixture was poured into 2 liter of acetone and a solid thus precipitated was collected by filtration. After washing the resulting solid with acetone, Specific ternary copolymer (3), that is, Exemplified compound (3) was obtained. After drying, the ternary copolymer thus obtained had a mass of 120 g. It was a polymer having a mass average molecular weight of 8,500 as measured by GPC (polyethylene oxide standard).

Specific ternary copolymer (3)

[Structure showing terpolymer with monomer units: 70 mol% -CH$_2$-CH(CONH$_2$)-, 10 mol% -CH$_2$-CH(CO$_2$CH$_2$CH$_2$OH)-, 20 mol% -CH$_2$-CH(CONH-CH$_2$CH$_2$CH$_2$-Si(OEt)$_3$)-]

Mass average molecular weight: 8500

The specific hydrophilic polymers used in Examples described below were synthesized in a similar manner to that described above and used for evaluation.

(Evaluation) The hydrophilic member described above was evaluated for the following properties.

Antifogging properties: A hydrophilic member was exposed to water vapor for 1 minute under a fluorescent lamp in a room in the daytime. After it was separated from water vapor, it was put in an environment at 25° C. and 10% RH, and then again exposed under the same conditions as previously under the fluorescent lamp. Then, the hydrophilic member was checked for fogging and change, and was organoleptically evaluated based on the following three criteria:

A: No fogging was found.
B: Fogging was found but it disappeared within 10 seconds, and no more fogging was found thereafter.
C: Fogging was found, and the fogging did not disappear even after 10 seconds.

Antifouling properties: A line was drawn on the surface of the hydrophilic member using an oily ink (Mitsubishi Pencil's oily marker), a water jet was continuously applied thereto, and the hydrophilic member was checked whether the line was erased off or not, and was organoleptically evaluated based on the following three criteria:

A: Ink was removed within 30 seconds.
B: Ink was removed within 1 minute.
C: Ink was removed after 1 minute.
D: Even after 2 minutes, ink was not removed over 10 minutes.

Adhesion properties: A hydrophilic member was stored in water of 60° C. and a test on adhesion properties after storage for ten days and storage for one month was performed. The test was a 2-mm cross-cut exfoliation test in accordance with JISK5400.

A: Less than 5% of cross-cuts peeled off.
B: From 5% but less than 10% of cross-cuts peeled off.
C: From 10 to 50% of cross-cuts peeled off.
D: Greater than 50% of cross-cuts peeled off.

Scratch test: The surface of the hydrophilic layer was scanned by applying a load thereon at regular intervals of 5 g starting from 5 g on a 0.1-mm diameter sapphire needle and the load under which the layer was scratched was measured (with Shinto Science's Scratch Strength Tester "Type 185"). The hydrophilic member free of scratches even when scratched under a higher load is regarded to have good durability.

Weather resistance: A hydrophilic member was exposed for 500 hours in a sun-shine carbon arc lamp-type accelerated weathering tester and evaluated for hydrophilicity, antifogging properties, antifouling properties, visible light transmittivity, adhesion properties, and scratch resistance in accordance with the above-mentioned methods. The member was rated according to the following criteria.

A: The performance is the same as that before exposure in all items.
B: The performance is inferior to that before exposure in one item.
C: The performance is inferior to that before exposure in two or more items.

Water resistance: A hydrophilic member having a size of 120 cm² was rubbed in water with a sponge at 10 times reciprocation under a load of 1 kg and a residual film ratio was determined from a mass change before and after the rubbing.

The results of the above-mentioned evaluations are shown in Table 1. The hydrophilic member show good antifogging properties, antifouling properties, and adhesion properties. In the scratch resistance, the hydrophilic member is free from scratches until the load is 50 g and thus has excellent durability.

Comparative Example 1

In a similar manner to Example 1 except that the specific ternary copolymer was replaced with the following Comparative Compound (1), a hydrophilic film was formed and it was evaluated as in Example 1. The results are shown in Table 1. The surface energy in terms of surface energy, antifogging properties, and antifouling properties were 45 mN/m, rank C, and rank C, respectively, suggesting that the hydrophilic member was inferior to the hydrophilic member obtained in Example 1 in hydrophilicity and antifouling properties.

Comparative Compound (1)

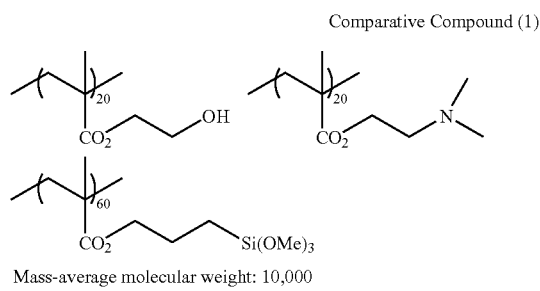

Mass-average molecular weight: 10,000

TABLE 1

| Examples | Hydrophilicity Surface energy | Antifogging properties | Antifouling properties | Visible light transmissivity | Adhesion properties 10 days | Adhesion properties 1 month | Scratch resistance | Weather resistance | Water resistance |
|---|---|---|---|---|---|---|---|---|---|
| Ex. 1 | 82 mN/m | A | A | 87% | A | B | 50 g | A | 99% |
| Ex. 2 | 80 mN/m | A | A | 85% | A | B | 70 g | A | 100% |
| Ex. 3 | 82 mN/m | A | A | 88% | A | B | 65 g | A | 99% |
| Ex. 4 | 85 mN/m | A | A | 89% | A | B | 45 g | A | 97% |
| Ex. 5 | 84 mN/m | A | A | 86% | A | B | 70 g | A | 97% |
| Ex. 6 | 82 mN/m | A | A | 87% | A | A | 80 g | A | 99% |
| Ex. 7 | 80 mN/m | A | A | 88% | A | A | 75 g | A | 97% |
| Ex, 8 | 83 mN/m | A | A | 89% | A | A | 85 g | A | 99% |
| Ex. 9 | 85 mN/m | A | A | 86% | A | A | 75 g | A | 97% |
| Ex. 10 | 85 mN/m | A | A | 87% | A | A | 80 g | A | 99% |
| Ex. 11 | 82 mN/m | A | A | 87% | A | A | 80 g | A | 99% |
| Ex. 12 | 82 mN/m | A | A | — | A | A | 85 g | A | 99% |
| Ex. 13 | 75 mN/m | B | B | — | A | A | 85 g | A | 100% |
| Comp. Ex. 1 | 45 mN/m | C | C | 85% | A | A | 70 g | A | 99% |
| Comp. Ex. 2 | 40 mN/m | C | C | 85% | B | B | 75 g | A | 99% |
| Comp. Ex. 3 | 82 mN/m | A | A | — | B | C | 30 g | A | 65% |

Examples 2 to 5

In a similar manner to Example 1 except that the specific ternary copolymer was replaced with compounds shown in Table 2, hydrophilic films and hydrophilic members were formed and they were evaluated as in Example 1. The results are shown in Table 1.

TABLE 2

| | Specific ternary copolymer | LogP of hydrophilic unit |
|---|---|---|
| Example 2 | (2) | −0.61 |
| Example 3 | (4) | −0.61 |
| Example 4 | (5) | −0.61 |
| Example 5 | (10) | −1.61 |

TABLE 2-continued

| Specific ternary copolymer | LogP of hydrophilic unit |
|---|---|

Specific ternary copolymer (2) [structure: terpolymer with $CONH_2$ (60), $CO_2CH_2CH_2OH$ (30), $CONH(CH_2)_3Si(OEt)_3$ (10)]

Mass-average molecular weight: 15,000

(4) [structure: terpolymer with $CONH_2$ (70), $CO_2CH_2CH_2OH$ (20), $CONH(CH_2)_3Si(OEt)_3$ (10)]

Mass-average molecular weight: 18,000

TABLE 2-continued

| Specific ternary copolymer | LogP of hydrophilic unit |
|---|---|

(5) [structure: terpolymer with $CONH_2$ (80), $CO_2CH_2CH_2OH$ (10), $CONH(CH_2)_3Si(OEt)_3$ (10)]

Mass-average molecular weight: 19,000

TABLE 2-continued

| Specific ternary copolymer | LogP of hydrophilic unit |
|---|---|
| (10)  | |

Mass-average molecular weight: 11,000

Example 6

A float sheet glass (thickness: 2 mm), that is, a most popular transparent sheet glass was prepared, and the surface of the sheet glass was made hydrophilic through UV/$O_3$ treatment for 10 minutes. Then, First-layer coating liquid (1) having the following composition was spin-coated onto it, and dried in an oven at 100° C. for 10 minutes to form a first layer having a dry weight of 1.0 g/m². After cooling sufficiently at room temperature, Hydrophilic-layer coating liquid (1) used in Example 1 was spin-coated as a second layer onto the surface of the first layer, followed by oven drying at 100° C. for 10 minutes to form a second layer having a dry weight of 1.0 g/m². The hydrophilic member thus obtained had a surface free energy of 82 mN/m and thus had a highly hydrophilic surface. The hydrophilic layer had a visible light transmissivity of 87% (as measured using "Hitachi spectrophotometer U3000").

<First-Layer Coating Liquid (1)>

| | |
|---|---|
| A 20 mass % aqueous solution of colloidal silica dispersion ("SNOWTEX C", product of Nissan Chemical Industries) | 100 g |
| Sol-gel preparation solution (2) | 500 g |
| A 5 mass % aqueous solution of Anionic surfactant (1) described above | 30 g |
| Purified water | 450 g |

<Sol-Gel Preparation Solution (2)>

The solution was prepared by mixing 8 g of tetramethoxysilane (product of Tokyo Chemical Industry) in 200 g of ethyl alcohol, 10 g of acetylacetone, 10 g of tetraethyl orthotitanate, and 100 g of purified water and then stirring the resulting mixture at room temperature for 2 hours.

Examples 7 to 10

In a similar manner to Example 6 except that Specific ternary copolymer (3) in the hydrophilic-layer coating liquid used for the second layer was replaced with specific ternary copolymers shown in Table 3, hydrophilic films were formed and they were evaluated as in Example 1. The evaluation results are shown in Table 1.

TABLE 3

| | Specific ternary copolymer | LogP of hydrophilic unit |
|---|---|---|
| Example 7 | (13) | 0.26 |
| Example 8 | (16) | −1.46 |

TABLE 3-continued

| | Specific ternary copolymer | LogP of hydrophilic unit |
|---|---|---|
| Example 9 | (28) | −1.55 |
| Example 10 | (33) | −1.56 |

Specific ternary copolymers

(13) 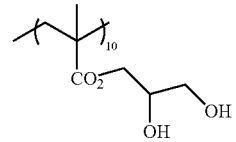

Mass-average molecular weight: 9,500

(16) 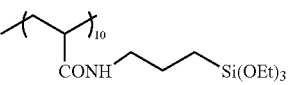

Mass-average molecular weight: 25,000

(28) 

Mass-average molecular weight: 18,000

(33) 

Mass-average molecular weight: 15,000

Example 11

A polyethylene terephthalate (PET) substrate (thickness: 50 μm) having a surface hydrophilized through glow treatment was prepared. First-layer coating liquid (2) having the following composition was spin-coated onto the surface (at 1000 rpm for 30 seconds), followed by oven drying at 100° C. for 2 minutes to form a first layer having a dry weight of 0.5 g/m². The water contact angle with the first layer was 80°. Then, Hydrophilic-layer coating liquid (1) used in Example 1 was spin-coated (at 100 rpm for 2 minutes, at 50 rpm for 5 minutes, and then at 200 rpm for 2 minutes) onto the first layer, followed by oven drying at 100° C. for 10 minutes to form a hydrophilic layer having a dry weight of 2.0 g/m² and thereby form a hydrophobic member. The spin-coated surface was in a good condition. The resulting hydrophilic member had a surface free energy of 82 mN/m and thus had a highly hydrophilic surface. It had a visible light transmissivity of 87% (as measured using "Hitachi spectrophotometer U3000").

<First-Layer Coating Liquid (2)>

| | |
|---|---|
| "Epicoat 1009" (product of Shell Chemicals Japan) | 100 g |
| "Takenate D110N" (product of Takeda Pharmaceutical, having a solid content of 10%) | 100 g |
| Methyl ethyl ketone | 1200 g |

Comparative Example 2

In a similar manner to Example 11 except that the specific ternary copolymer was replaced with the following Comparative compound (2), a hydrophilic film and a hydrophilic member were formed. Evaluation results are shown in Table 1. The hydrophilicity in terms of surface energy, antifogging properties, and antifouling properties of the resulting hydrophilic member are 40 mN/m, rank C, and rank C, respectively. Thus, it is inferior to that of Example 11 in hydrophilicity and antifouling properties.

Comparative compound (2)

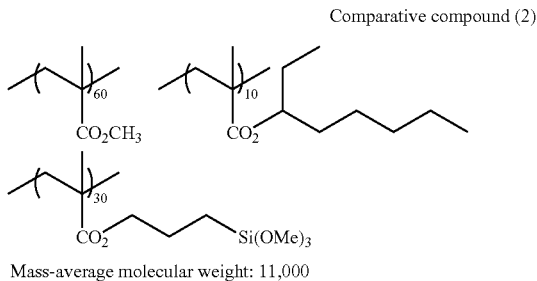

Mass-average molecular weight: 11,000

Example 12

The first layer as described in Example 11 was formed on an SUS substrate (thickness: 1.1 mm) having a surface hydrophilized through UV/O$_3$ treatment for 10 minutes. First-layer coating liquid (3) having the following composition was spin-coated (at 1000 rpm for 60 seconds) on the first layer, followed by oven drying at 100° C. for 10 minutes to form a layer having a dry weight of 0.5 g/m². The first layer of a double-layer structure was thus obtained. The layer formed using First-layer coating liquid (3) had a water contact angle of 10°. A hydrophilic layer similar to that of Example 1 was then formed on the first layer of the double-layer structure. A hydrophilic member thus obtained had comparable hydrophilicity to that of Example 1. Evaluation results are shown in Table 1.

<First-Layer Coating Liquid (3)>

| | |
|---|---|
| Aqueous solution of "PVA 105" (product of Kuraray, solid content: 6%) | 130 g |
| Aqueous solution of glyoxal (product of Tokyo Chemical Industry, solid content: 40%) | 50 g |
| Ethylene glycol diglycidyl ether (product of Tokyo Chemical Industry) | 10 g |
| Methanol silica (product of Nissan Chemical, solid content: 30%) | 30 g |
| A 5 mass % aqueous solution of Anionic surfactant (1) as described above | 20 g |
| Water | 7600 g |

Comparative Example 3

Hydrophilic-layer coating liquid (2) described below was bar-coated onto an SUS substrate similar to that of Example 12 and having the first layer of a double structure, followed by oven drying at 100° C. for 10 minutes to form a hydrophilic layer having a dry weight of 1.0 g/m². A hydrophilic member was thus formed. Although the surface free energy, antifogging properties, and antifouling properties of the hydrophilic member were 82 mN/m, rank B, and rank A, respectively, it was inferior to that of Example 12 in water resistance. The results are shown in Table 1.

<Hydrophilic-Layer Coating Liquid (2)>

| | |
|---|---|
| Sol-gel preparation solution (3) described below | 500 g |
| A 5 mass % aqueous solution of Anionic surfactant (1) described above | 30 g |
| Purified water | 450 g |

<Sol-Gel Preparation Solution (3)>

The solution was prepared by mixing 8 g of tetramethoxysilane (product of Tokyo Chemical Industry) and 4 g of Specific ternary copolymer (3) (Exemplified compound (3), Log P of hydrophilic unit=−0.61) in 200 g of ethyl alcohol, 10 g of 1N hydrochloric acid, and 100 g of purified water and then, stirring the resulting mixture at room temperature for 2 hours.

Example 13

In a similar manner to Example 12 except that the specific ternary copolymer was replaced with Exemplified Compound (1) (Log P of hydrophilic unit=−0.3), a hydrophilic member was prepared. The results are shown in Table 1.

Specific ternary copolymer (1)

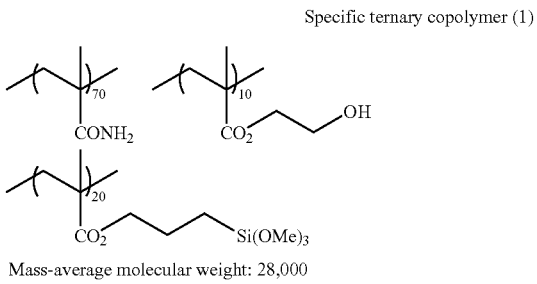

Mass-average molecular weight: 28,000

Example 14

A float sheet glass (thickness: 2 mm), that is, most popular transparent sheet glass was prepared. After the surface of the sheet glass was made hydrophilic through UV/O$_3$ treatment for 10 minutes, Hydrophilic-layer coating liquid (3) having the following composition was bar-coated. Oven drying was then performed at 100° C. for 10 minutes to form a hydrophilic layer having a dry weight of 1.0 g/m² and then, a hydrophilic member. The resulting hydrophilic member has a surface free energy of 82 mN/m and thus had a highly hydrophilic surface. The hydrophilic layer had a visible light transmissivity of 87% (as measured using "Hitachi Spectrophotometer U3000").

<Hydrophilic-Layer Coating Liquid (3)>

| | |
|---|---|
| Sol-gel preparation solution (4) described below | 500 g |
| A 5 mass % aqueous solution of Anionic surfactant (1) described above | 30 g |
| Purified water | 450 g |

<Sol-Gel Preparation Solution (4)>

The sol-gel preparation solution was prepared by mixing 8 g of tetramethoxysilane (product of Tokyo Chemical Industry), 4 g of Specific ternary copolymer (3) (Exemplified compound (3), Log P of hydrophilic group unit=−0.61), and 1 g of ethylene glycol diglycidyl ether in 200 g of ethyl alcohol, 10 g of acetylacetone, 10 g of tetraethyl orthotitanate, and 100 g of purified water and then stirring the resulting mixture at room temperature for 2 hours.

(Evaluation)

The hydrophilic member prepared above was evaluated for the following property.

Alkali resistance: The member was dipped in a 1N aqueous sodium hydroxide solution for 24 hours and a deterioration degree of the film was organoleptically evaluated based on the following three criteria.

A: No change
B: Partial whitening
C: Exfoliation of film

The results are shown in Table 4. The hydrophilic member had good antifogging properties, antifouling properties and alkali resistance. In the scratch test, it was free from scratches under loads increased to 70 g and thus had excellent durability.

Comparative Example 4

In a similar manner to Example 14 except the specific ternary copolymer was replaced with Comparative compound (1), a hydrophilic film and a hydrophilic member were prepared. The results are shown in Table 4. The hydrophilicity in terms of surface free energy, antifogging properties, and antifouling properties of the hydrophilic member were 45 mN/m, rank C, and rank C, respectively. Thus, it was inferior to that of Example 14 in hydrophilicity, antifogging properties, and antifouling properties.

Comparative Example 5

In a similar manner to Example 14 except that the specific ternary copolymer was replaced with Comparative compound (2) and ethylene glycol diglycidyl ether was not added, a hydrophilic film and a hydrophilic member were prepared. The results are shown in Table 4. The hydrophilicity in terms of surface free energy, antifogging properties, antifouling properties, and alkali resistance of the hydrophilic member were 40 mN/m, rank C, rank C, and rank C, respectively. Thus, it was inferior to that of Example 14 in hydrophilicity, antifogging properties, antifouling properties, and alkali resistance.

TABLE 4

| Examples | Hydrophilicity Surface energy | Antifogging properties | Antifouling properties | Visible light transmissivity | Alkali resistance | Scratch resistance | Weather resistance | Water resistance |
|---|---|---|---|---|---|---|---|---|
| Ex. 14 | 82 mN/m | A | A | 87% | A | 70 g | A | 100% |
| Ex. 15 | 80 mN/m | A | A | 85% | A | 90 g | A | 100% |
| Ex. 16 | 82 mN/m | A | A | 88% | A | 85 g | A | 100% |
| Ex. 17 | 85 mN/m | A | A | 89% | A | 65 g | A | 99% |
| Ex. 18 | 84 mN/m | A | A | 86% | A | 90 g | A | 99% |
| Ex. 19 | 82 mN/m | A | A | 87% | A | 100 g | A | 100% |
| Ex. 20 | 83 mN/m | A | A | 88% | A | 120 g | A | 100% |
| Ex. 21 | 84 mN/m | A | A | 89% | A | 120 g | A | 100% |
| Ex. 22 | 84 mN/m | A | A | 86% | A | 120 g | A | 100% |
| Ex. 23 | 85 mN/m | A | A | 87% | A | 80 g | A | 99% |
| Ex. 24 | 82 mN/m | A | A | 87% | A | 100 g | A | 100% |
| Ex. 25 | 85 mN/m | A | A | — | A | 110 g | A | 100% |
| Ex. 26 | 83 mN/m | A | A | — | A | 130 g | A | 100% |
| Ex. 27 | 75 mN/m | B | B | 87% | A | 85 g | A | 100% |
| Comp. Ex. 4 | 45 mN/m | C | C | 85% | A | 50 g | A | 99% |
| Comp. Ex. 5 | 40 mN/m | C | C | 85% | C | 50 g | A | 99% |
| Comp. Ex. 6 | 81 mN/m | A | A | 85% | A | 100 g | A | 70% |

Examples 15 to 18

In a similar manner to Example 14 except that the specific ternary copolymer was replaced with the compounds shown in Table 5, hydrophilic films and hydrophilic members were prepared. The results are shown in Table 4.

TABLE 5

| | Specific ternary copolymer | LogP of hydrophilic unit |
|---|---|---|
| Example 15 | (2) | −0.61 |
| Example 16 | (4) | −0.61 |
| Example 17 | (5) | −0.61 |
| Example 18 | (10) | −1.61 |

Example 19

A float sheet glass (thickness: 2 mm), that is, a most popular transparent sheet glass was prepared. After the surface of the sheet glass was made hydrophilic through UV/O$_3$ treatment for 10 minutes, First-layer coating liquid (1) having the following composition was spin-coated. Oven drying was then performed at 100° C. for 10 minutes to form a first layer having a dry weight of 1.0 g/m². After sufficient cooling at room temperature, Hydrophilic-layer coating liquid (3) used in Example 14 was spin-coated as a second layer onto the first-layer coated surface. Oven drying was performed at 100° C. for 10 minutes to form a second layer having a dry weight of 1.0 g/m². The resulting hydrophilic member had a surface free energy of 82 mN/m, suggesting that it had a surface with an extremely high hydrophilicity. The hydrophilic layer had a visible light transmissivity of 87% (as measured using "Hitachi Spectrophotometer U3000").

<First-Layer Coating Liquid (1)>

| | |
|---|---|
| A 20 mass % aqueous solution of colloidal silica dispersion ("SNOWTEX C") | 100 g |
| Sol-gel preparation solution (2) described below | 500 g |
| A 5 mass % aqueous solution of Anionic surfactant (1) described above | 30 g |
| Purified water | 450 g |

<Sol-Gel Preparation Solution (2)>

The sol-gel preparation solution was prepared by mixing 8 g of tetramethoxysilane (product of Tokyo Chemical industry) in 200 g of ethyl alcohol, 10 g of acetylacetone, 10 g of tetraethyl orthotitanate, and 100 g of purified water and then stirring the resulting mixture at room temperature for 2 hours.

Examples 20 to 23

In a similar manner to Example 19 except that the specific ternary copolymer (Exemplified compound (3)) in the second-layer coating liquid was replaced with the specific ternary copolymers shown in Table 6, hydrophilic films and hydrophilic members were prepared. The evaluation results are shown in table 4.

TABLE 6

| | Specific ternary copolymer | LogP of hydrophilic unit |
|---|---|---|
| Example 20 | (15) | −0.61 |
| Example 21 | (16) | −1.46 |
| Example 22 | (18) | −1.46 |
| Example 23 | (28) | −1.55 |

Specific ternary copolymers

(15) 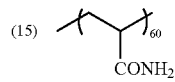 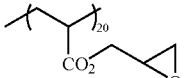

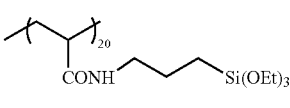

Mass-average molecular weight: 18,000

(18)  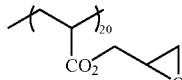

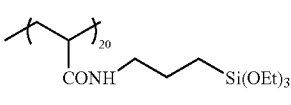

Mass-average molecular weight: 28,000

Example 24

A polyethylene terephthalate (PET) substrate (thickness: 50 μm) having a surface made hydrophilic through glow treatment was prepared. First-layer coating liquid (2) having the below-described composition was spin-coated (for 30 seconds at 1000 rpm), followed by oven drying at 100° C. for 2 minutes to form a first layer having a dry weight of 0.5 g/m². The first layer had a water contact angle of 80°. Then, Hydrophilic-layer coating liquid (3) used in Example 14 was spin-coated (for 2 minutes at 100 rpm, for 5 minutes at 50 rpm, and then for 2 minutes at 200 rpm) onto the first layer, followed by oven drying at 100° C. for 10 minutes to form a hydrophilic layer having a dry weight of 2.0 g/m² and a hydrophilic member. The condition of the coated surface was good. The resulting hydrophilic member had a surface free energy of 82 mN/m, suggesting that it had a surface with extremely high hydrophilicity. The hydrophilic layer had a visible light transmissivity of 87% (as measured using "Hitachi Spectrophotometer U3000").

<First-Layer Coating Liquid (2)>

| | |
|---|---|
| "Epicoat 1009" (product of Shell Chemicals Japan) | 100 g |
| "Takenate D110N" (product of Takeda Pharmaceutical, solid content: 10%) | 100 g |
| Methyl ethyl ketone | 1200 g |

Comparative Example 6

Hydrophilic-layer coating liquid (4) shown below was bar-coated onto a PET substrate having thereon a similar first layer to that of Example 24, followed by oven drying at 100° C. for 10 minutes to form a hydrophilic layer having a dry weight of 1.0 g/m² and a hydrophilic member. The surface free energy, antifogging properties, and antifouling properties of the resulting hydrophilic member were 811 mN/m, rank A and rank A, respectively. It was however inferior in water resistance to the hydrophilic member of Example 24. The results are shown in Table 4.

<Hydrophilic-Layer Coating Liquid (4)>

| | |
|---|---|
| Sol-gel preparation solution (5) described below | 500 g |
| A 5 mass % aqueous solution of Anionic surfactant (1) described above | 30 g |
| Purified water | 450 g |

<Sol-Gel Preparation Solution (5)>

The sol-gel preparation solution was prepared by mixing 8 g of tetramethoxysilane (product of Tokyo Chemical Industry), 4 g of Specific ternary copolymer (3) (Exemplified compound (3), Log P of hydrophilic unit=−0.61), and 1 g of ethylene glycol diglycidyl ether in 200 g of ethyl alcohol, 10 g of 1N hydrochloric acid, and 100 g of purified water and then stirring the resulting mixture at room temperature for 2 hours.

Example 25

A first layer as described in Example 24 was formed on an SUS substrate (thickness: 1.1 mm) having a surface made hydrophilic through UV/O₃ treatment for 10 minutes. First-layer coating liquid (3) having the following composition was spin-coated (for 60 seconds at 1000 rpm) onto the first layer, followed by oven drying at 100° C. for 10 minutes to form a layer having a dry weight of 0.5 g/m². In such a manner, the first layer of a double-layer structure was formed. The layer thus formed using First-layer coating liquid (3) had a water contact angle of 10°. Then, a hydrophilic layer as in Example 14 was formed on the first layer of the double-layer structure. The hydrophilic member thus obtained had comparable hydrophilicity to that of Example 14. The results are shown in Table 4.

<First-Layer Coating Liquid (3)>

| | |
|---|---|
| Aqueous solution of "PVA 105" (product of Kuraray, solid content: 6%) | 130 g |
| Aqueous solution of glyoxal (product of Tokyo Chemical Industry, solid content: 40%) | 50 g |
| Ethylene glycol diglycidyl ether (product of Tokyo Chemical Industry) | 10 g |
| Methanol silica (product of Nissan Chemical, solid content: 30%) | 30 g |
| A 5 mass % aqueous solution of Anionic surfactant (1) described above | 20 g |
| Water | 7600 g |

Example 26

A substrate and a first layer of a double-layer structure similar to those of Example 25 were prepared. Hydrophilic-layer coating liquid (5) having the following composition was bar-coated to the first layer, followed by oven drying at 100° C. for 10 minutes to form a hydrophilic layer having a dry weight of 1.0 g/m² and a hydrophilic member. The resulting hydrophilic member had a surface free energy of 83 mN/m, suggesting that it had a surface with high hydrophilicity. The hydrophilic layer had a visible light transmissivity of 87% (as measured using "Hitachi spectrophotometer U3000").

<Hydrophilic-Layer Coating Liquid (5)>

| | |
|---|---|
| Sol-gel preparation solution (6) described below | 500 g |
| A 5 mass % aqueous solution of Anionic surfactant (1) described above | 30 g |
| Purified water | 450 g |

<Sol-Gel Preparation Solution (6)>

The sol-gel preparation solution was prepared by mixing 8 g of tetramethoxysilane (product of Tokyo Chemical Industry), 4 g of Specific ternary copolymer (26) (Exemplified compound (26), Log P of hydrophilic unit=−0.23), 1 g of ethylene glycol, and 0.2 g of bismuth tris(2-ethylhexanoate) in 200 g of ethyl alcohol, 10 g of acetylacetone, 10 g of tetraethyl orthotitanate, and 100 g of purified water and then stirring the resulting mixture at room temperature for 2 hours.

Specific ternary copolymer (26)

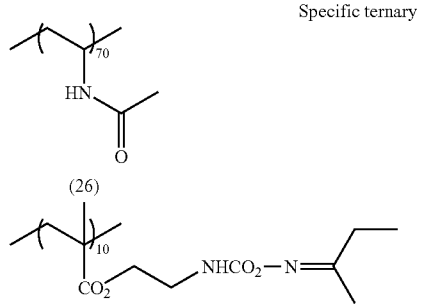

-continued

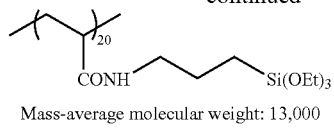

Mass-average molecular weight: 13,000

Example 27

In a similar manner to Example 14 except that the specific ternary copolymer was replaced with Specific ternary copolymer (1) (Log P of hydrophilic unit=−0.3), a hydrophilic member was prepared. The results are shown in Table 4.

Example 28

A substrate and a first layer similar to those of Example 19 were formed. Hydrophilic-layer coating liquid (6) having the following composition was bar-coated as a second layer onto the surface of the first layer, followed by oven drying at 150° C. for 30 minutes to form a second layer having a dry weight of 3.0 g/m² and a hydrophilic member. Evaluation results are shown in Table 8.

<Hydrophilic-Layer Coating Liquid (6)>

| | |
|---|---|
| Sol-gel preparation solution (7) described below | 500 g |
| A 5 mass % aqueous solution of Anionic surfactant (1) described above | 30 g |
| Purified water | 450 g |

<Sol-Gel Preparation Solution (7)>

The sol-gel preparation solution was prepared by mixing 30 g of Specific ternary copolymer (3) (Exemplified compound (3), Log P of hydrophilic group unit=−0.61) in 200 g of ethyl alcohol, 10 g of acetylacetone, 0.3 g of tetraethyl orthotitanate, and 300 g of purified water and then stirring the resulting mixture at room temperature for 2 hours.

Example 29

A substrate and a first layer similar to those of Example 19 were prepared. Hydrophilic-layer coating liquid (7) described below was bar-coated as a second layer onto the surface of the first layer, followed by oven drying at 150° C. for 30 minutes to form a second layer having a dry weight of 3.0 g/m² and a hydrophilic member. Evaluation results are shown in Table 8.

<Hydrophilic-Layer Coating Liquid (7)>

| | |
|---|---|
| Sol-gel preparation solution (8) described below | 500 g |
| A 5 mass % aqueous solution of Anionic surfactant (1) described above | 30 g |
| Purified water | 450 g |

<Sol-Gel Preparation Solution (8)>

The sol-gel preparation solution was prepared by mixing 24 g of Specific ternary copolymer (3) (Exemplified compound (3), Logγ of hydrophilic group unit=−0.61) and 6 g of ethylene glycol diglycidyl ether in 200 g of ethyl alcohol, 10 g of acetylacetone, 0.3 g of tetraethyl orthotitanate, and 300 g of purified water and then stirring the resulting mixture at room temperature for 2 hours.

Examples 30 to 32

In a similar manner to Example 28 except that the specific ternary copolymer was replaced with specific ternary copolymers shown in Table 7, hydrophilic members were prepared. Evaluation results of them are shown in Table 8.

TABLE 7

| | Specific ternary copolymer | LogP of hydrophilic unit |
|---|---|---|
| Example 30 | (16) | −1.46 |
| Example 31 | (28) | −1.55 |
| Example 32 | (34) | −1.56 |

Specific ternary copolymer

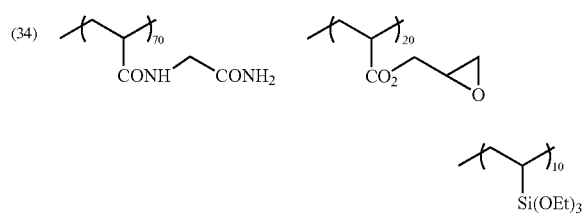

Mass-average molecular weight: 9,500

TABLE 8

| Examples | Hydrophilicity Surface energy | Antifogging properties | Antifouling properties | Visible light transmissivity | Adhesion properties | Scratch resistance | Weather resistance | Water resistance |
|---|---|---|---|---|---|---|---|---|
| Ex. 28 | 82 mN/m | A | A | 87% | A | 60 g | A | 98% |
| Ex. 29 | 82 mN/m | A | A | 85% | A | 80 g | A | 100% |
| Ex. 30 | 83 mN/m | A | A | — | A | 60 g | A | 98% |
| Ex. 31 | 84 mN/m | A | A | — | A | 60 g | A | 97% |
| Ex. 32 | 84 mN/m | A | A | — | A | 65 g | A | 97% |

Example 33

An aluminum plate (A1200, thickness: 0.1 mm) dipped for 10 minutes in an alkali washing liquid ("SemiClean A", product of Yokohama Oils & Fats Industry, a 5% aqueous solution) and washed with water three times was prepared. First-layer coating liquid (4) having the following composition was bar-coated, followed by oven drying at 100° C. for 10 minutes to form a first layer having a dry weight of 0.1 g/m². After sufficient cooling at room temperature, Hydrophilic-layer coating liquid (8) described below was bar-coated as a second layer onto the surface of the first layer, followed by oven drying at 150° C. for 30 minutes to form a second layer having a dry weight of 0.5 g/m² and form a hydrophilic member. The resulting member was then evaluated.

<First-Layer Coating Liquid (4)>

| | |
|---|---|
| Sol-gel preparation solution (9) described below | 500 g |
| A 5 mass % aqueous solution of Anionic surfactant (1) described above | 30 g |
| Purified water | 450 g |

<Sol-Gel Preparation Solution (9)>

The sol-gel preparation solution was prepared by mixing 4 g of tetramethoxysilane (product of Tokyo Chemical Industry) and 4 g of methyltrimethoxysilane (product of Tokyo Chemical Industry) in 200 g of ethyl alcohol, 10 g of acetylacetone, 10 g of tetraethyl orthotitanate, and 100 g of purified water and then stirring the resulting mixture at room temperature for 2 hours.

<Hydrophilic-Layer Coating Liquid (8)>

| | |
|---|---|
| Sol-gel preparation solution (10) described below | 500 g |
| A 5 mass % aqueous solution of Anionic surfactant (1) described above | 5.0 g |

<Sol-Gel Preparation Solution (10)>

The sol-gel preparation solution was prepared by mixing 22.5 g of (A) Specific ternary copolymer (3) (Exemplified compound (3), Log P of hydrophilic group unit=−0.61, mass-average molecular weight: 20,000) and 7.5 g of (A-1) Specific hydrophilic polymer 1 (Exemplified compound 1) in 200 g of ethyl alcohol, 0.25 g of acetylacetone, 0.3 g of tetraethyl orthotitanate, and 300 g of purified water and then stirring the resulting mixture at room temperature for 2 hours.

Specific hydrophilic polymer 1

(MeO)₃Si∼∼∼S∼(∼)∼CONH₂

Mass-average molecular weight: 9,000

(Evaluation)

The above-mentioned hydrophilic member was subjected to the following evaluation. The results are shown in table 10.

Adhesion properties: A cellophane tape was adhered onto the hydrophilic member and was then peeled off. Whether the hydrophilic film was exfoliated or not was visually observed.

A: No exfoliation

B: Partial exfoliation

C: Entire exfoliation

Antifouling properties (resistance to palmitic acid): In a 50-ml glass vessel, 0.2 g of palmitic acid was weighed. The vessel was closed with a lid so that a hydrophilic film side of an aluminum substrate having a hydrophilic film applied thereto was exposed to palmitic acid. After exposure at 105° C. for one hour, the substrate was subjected to five cycles of 30-minutes washing with running water and 80° C./30 minutes drying. Then, the contact angle was measured. The smaller the contact angle, the better the antifouling properties.

Referential Example

In a similar manner to Example 33 except that Specific hydrophilic polymer (A-1) in Hydrophilic-layer coating liquid (8) was replaced with polyacrylamide (mass-average molecular weight: 8000), a hydrophilic member was prepared. The hydrophilic member thus obtained was then evaluated.

Examples 34 to 37

In a similar manner to Example 33 except that the kind and mass ratio of Specific ternary copolymer (A) and Specific hydrophilic polymer (A-1) in Hydrophilic-layer coating liquid (8) were changed as shown in Table 9, hydrophilic members were prepared. The hydrophilic members thus obtained were then evaluated.

TABLE 9

| | (A) Specific ternary copolymer/LogP | (A-1) Specific hydrophilic polymer | (A)/(A-1) mass ratio |
|---|---|---|---|
| Ex. 34 | (3)/−0.61 | 1 | 90/10 |
| Ex. 35 | (3)/−0.61 | 1 | 60/40 |
| Ex. 36 | (16)/−1.46 | 13 | 75/25 |
| Ex. 37 | (28)/−1.55 | 19 | 75/25 |

Specific hydrophilic polymer 13

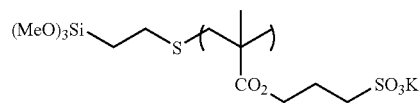

Mass-average molecular weight: 10,000

Specific hydrophilic polymer 19

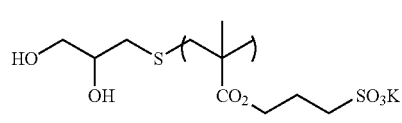

Mass-average molecular weight: 8,500

TABLE 10

| Examples | Hydrophilicity Surface energy | Alkali resistance | Scratch resistance | Water resistance | Antifouling properties (resistance to palmitic acid) (contact angle) | Adhesion properties |
|---|---|---|---|---|---|---|
| Ex. 33 | 83 mN/m | A | 60 g | 98% | 25° | A |
| Ex. 34 | 80 mN/m | A | 55 g | 99% | 28° | A |
| Ex. 35 | 82 mN/m | A | 65 g | 97% | 20° | A |
| Ex. 36 | 83 mN/m | A | 60 g | 98% | 24° | A |
| Ex. 37 | 80 mN/m | A | 60 g | 98% | 25° | A |
| Ref. Ex. | 80 mN/m | C | 50 g | 65% | 65° | C |

The present invention was described in detail referring to specific embodiments and it is apparent for those skilled in the art that various variations or modifications can be added without departing from the spirit and scope of the present invention.

The present application is based on Japanese Patent Application (Japanese Patent Application No. 2007-129894) filed on May 15, 2007 and Japanese Patent Application (Japanese Patent Application No. 2008-79324) filed on Mar. 25, 2008, all of which is incorporated herein by reference.

The invention claimed is:

1. A hydrophilic coating composition comprising:
   (A) a ternary copolymer comprising
   a1) a repeating unit having at least one hydrophilic group selected from the group consisting of —NHCOR$^3$, —CONH$_2$, —CON(R$^3$)$_2$, —COR$^3$, —CO$_2$M, —SO$_3$M, —PO$_3$M, —OPO$_3$M, and —N(R$^3$)$_3$Z, in which R$^3$ represents a linear, branched, or cyclic alkyl group having from 1 to 18 carbon atoms, an aryl group, or an aralkyl group, M represents a hydrogen atom, an alkali metal, an alkaline earth metal, or an onium, and Z represents a halogen ion,
   a2) a repeating unit having at least one of a hydroxyl group, an epoxy group, an isocyanato group, a blocked isocyanato group, a carboxylic acid anhydride group, and an amino group, and
   a3) a repeating unit having at least one hydrolyzable silyl group selected from the group consisting of vinyltrimethoxysilane, vinyltriethoxysilane, γ-(meth)acrylamidopropyltriethoxysilane, and γ-(meth)acrylamidopropyltrimethoxysilane; and
   (B) a metal complex catalyst,
   wherein
   a content of the repeating unit a1) having at least one hydrophilic group in the ternary copolymer is 50 mol % or greater.

2. The hydrophilic coating composition according to claim 1,
   wherein the repeating unit a1) has a Log P of from 1 to −6; wherein Log P means a logarithm of an octanol/water distribution coefficient (P) of a compound.

3. The hydrophilic coating composition according to claim 1,
   wherein the metal complex catalyst (B) has:
   a metal element selected from metal elements in Groups 2A, 3B, 4A, and 5A of the periodic table; and
   an oxo or hydroxy oxygen compound selected from β-diketones, ketoesters, hydroxycarboxylic acids or esters thereof, amino alcohols, and enolic active hydrogen compounds.

4. The hydrophilic coating composition according to claim 1, further comprising:
   (C) at least one of an alkoxide compound containing an element selected from Si, Ti, Zr, and Al, and a colloidal silica.

5. The hydrophilic coating composition according to claim 1, further comprising:
   (D) a compound having in a molecule thereof at least two groups selected from a hydroxyl group, an epoxy group, an isocyanato group, a blocked isocyanato group, and an amino group.

6. The hydrophilic coating composition according to claim 1, further comprising:

a hydrophilic polymer containing a structural unit represented by following formula (III):

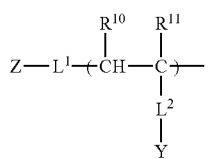

(III)

wherein in the formula (III). $R^{10}$ and $R^{11}$ each independently represents a hydrogen atom or a hydrocarbon group; Z represents a reactive group selected from the group consisting of carboxyl groups and salts thereof, carboxylic acid anhydride groups, amino groups, hydroxyl groups, epoxy groups, methylol groups, mercapto groups, isocyanato groups, blocked isocyanato groups, alkoxysilyl groups, alkoxy titanate groups, alkoxy aluminate groups, alkoxy zirconate groups, ethylenically unsaturated double bonds, ester bonds, and tetrazole groups; $L^1$ and $L^2$ each independently represents a single bond or a linking group; and Y represents, $-OR_a$, $-COR_a$, $-CO_2R_e$, $-CON(R_a)(R_b)$, $-N(R_a)(R_b)$, $-NHCOR_d$, $-NHCO_2R_d$, $-OCON(R_a)(R_b)$, $-SO_3R_e$, $-OSO_3R_e$, $-SO_2R_d$, $-NHSO_2R_d$, $-SO_2N(R_a)(R_b)$, $-N(R_a)(R_b)(R_c)$, $-N(R_a)(R_b)(R_c)(R_g)$, $-PO_3(R_e)(R_f)$, $-OPO_3(R_e)(R_f)$, or $-PO_3(R_d)(R_e)$, wherein $R_a$, $R_b$ and $R_c$ each independently represents a hydrogen atom or an alkyl group; $R_d$ represents an alkyl group; $R_e$ and $R_f$ each independently represents a hydrogen atom, an alkyl group, an alkali metal, an alkaline earth metal, or an onium; $R_g$ represents an alkyl group, a halogen atom, an inorganic anion, or an organic anion; and $R_a$ to $R_g$ may be each coupled to form a ring, and wherein a mass ratio of the hydrophilic polymer containing a structural unit represented by the formula (III)/the ternary copolymer (A) falls within a range of from 50/50 to 5/95.

7. A hydrophilic member obtained by applying the hydrophilic coating composition according to claim 1 onto a support selected from the group consisting of transparent glass substrates, transparent plastic substrates, lenses, prisms, mirrors, metals, ceramics, woods, stones, cements, concretes, fibers, textiles, papers, combinations thereof, and laminations thereof.

8. A fin stock to which the hydrophilic coating composition according to claim 1 is applied.

9. An aluminum fin stock to which the hydrophilic coating composition according to claim 1 is applied.

10. A heat exchanger comprising the aluminum fin stock according to claim 9.

11. An air conditioner comprising the heat exchanger according to claim 10.

* * * * *